US012743678B1

(12) United States Patent
Jilani

(10) Patent No.: US 12,743,678 B1
(45) Date of Patent: Sep. 22, 2026

(54) DLT-BASED PRIVATE BUSINESS HUB SYSTEM HAVING A PAYCHAT PLATFORM

(71) Applicant: Pinksurfing, Inc., Mountain View, CA (US)

(72) Inventor: Shaiquel Jilani, Anaheim, CA (US)

( * ) Notice: Subject to any disclaimer, the term of this patent is extended or adjusted under 35 U.S.C. 154(b) by 139 days.

(21) Appl. No.: 18/375,650

(22) Filed: Oct. 2, 2023

Related U.S. Application Data

(60) Provisional application No. 63/413,059, filed on Oct. 4, 2022.

(51) Int. Cl.

| | |
|---|---|
| ***G06Q 10/40*** | (2026.01) |
| ***G06Q 10/109*** | (2023.01) |
| ***G06Q 20/10*** | (2012.01) |
| ***G06Q 20/32*** | (2012.01) |
| ***G06Q 20/36*** | (2012.01) |
| ***G06Q 20/38*** | (2012.01) |

(52) U.S. Cl.
CPC ........... *G06Q 10/40* (2026.01); *G06Q 10/109* (2013.01); *G06Q 20/10* (2013.01); *G06Q 20/3267* (2020.05); *G06Q 20/3678* (2013.01); *G06Q 20/389* (2013.01)

(58) Field of Classification Search
CPC ...... G06Q 50/01; G06Q 10/109; G06Q 20/10; G06Q 20/3267; G06Q 20/3678; G06Q 20/389
See application file for complete search history.

(56) References Cited

U.S. PATENT DOCUMENTS

| | | | | |
|---|---|---|---|---|
| 6,931,114 | B1 * | 8/2005 | Martin | H04M 3/569 709/204 |
| 7,603,413 | B1 * | 10/2009 | Herold | H04L 12/1813 709/204 |
| 8,249,965 | B2 | 8/2012 | Tumminaro | |
| 8,606,225 | B2 | 12/2013 | Yang | |
| 8,738,496 | B2 | 5/2014 | Titus et al. | |
| 9,008,611 | B2 | 4/2015 | Thakur et al. | |
| 9,967,241 | B2 | 5/2018 | Raman et al. | |
| 10,893,036 | B2 | 1/2021 | Chang et al. | |

(Continued)

FOREIGN PATENT DOCUMENTS

| | | | |
|---|---|---|---|
| CN | 102647696 | A | 8/2012 |
| WO | 2012000213 | A1 | 1/2012 |

OTHER PUBLICATIONS

Verification and Approval Controls for Secondary Accounts (Year: 2022).*

(Continued)

*Primary Examiner* — Patrick McAtee
(74) *Attorney, Agent, or Firm* — John Rizvi; John Rizvi, P.A.—The Patent Professor®

(57) ABSTRACT

A DLT-based private business hub system and method for implementing a chat platform for exchanging and monetizing chat sessions. A blockchain-based private business bub system is provided comprising a blockchain-based paychat platform that facilitates various chat exchanges and the monetization thereof. The chat exchanges occur across a chat room platform delivered and enabled by the DLT-based private business hub system and paychat platform application that facilitate the exchange and monetization of paychat sessions using specifically configured electronic business cards for each paychat session type as triggering mechanisms.

19 Claims, 16 Drawing Sheets

(56) References Cited

U.S. PATENT DOCUMENTS

| | | | | |
|---|---|---|---|---|
| 11,861,617 | B2 * | 1/2024 | Mimassi | G06Q 20/3227 |
| 2002/0116458 | A1 * | 8/2002 | Bricklin | H04L 12/1822<br>709/204 |
| 2004/0215491 | A1 * | 10/2004 | Clark | G06Q 30/02<br>705/2 |
| 2006/0020596 | A1 * | 1/2006 | Liu | G06Q 30/0241 |
| 2006/0285670 | A1 * | 12/2006 | Chin | H04M 7/003<br>379/201.01 |
| 2007/0162553 | A1 * | 7/2007 | Dewing | H04L 65/4038<br>709/207 |
| 2010/0199340 | A1 * | 8/2010 | Jonas | H04L 51/04<br>726/8 |
| 2010/0211427 | A1 * | 8/2010 | Morelli | G06Q 10/109<br>705/26.1 |
| 2011/0270719 | A1 * | 11/2011 | Hollars | G06Q 30/02<br>705/30 |
| 2017/0011175 | A1 * | 1/2017 | Cocks | A61M 1/14 |
| 2017/0301012 | A1 * | 10/2017 | Jouhikainen | G06Q 40/02 |
| 2019/0347651 | A1 * | 11/2019 | Moreno | G06Q 20/385 |
| 2019/0356641 | A1 * | 11/2019 | Isaacson | H04L 9/3231 |
| 2020/0380495 | A1 * | 12/2020 | Kang | G06Q 20/4097 |
| 2023/0069223 | A1 * | 3/2023 | Patel | G06Q 20/065 |
| 2023/0186285 | A1 * | 6/2023 | Mawson | G06Q 20/381<br>705/40 |
| 2023/0252470 | A1 * | 8/2023 | Dhodapkar | G06Q 20/229<br>705/44 |
| 2023/0275857 | A1 * | 8/2023 | Suh | G06F 40/58 |

OTHER PUBLICATIONS

Method and System for Payments via Text Messages (Year: 2021).*

Systems and Methods for Providing a RF Transaction Device for Use in a Private Label Transaction (Year: 2005).*

Money Movement Network Hub System (Year: 2009).*

Methods and Systems for Micropayment Support to Blockchain Incentivized, Decentralized Data Streaming and Delivery (Year: 2020).*

System and Method for Providing Simplified In-Store, Product-Based and Rental Payment Processes (Year: 2019).*

* cited by examiner

START

202

ESTABLISHING, BY A DLT-BASED PRIVATE BUSINESS HUB SYSTEM, A FIRST PLURALITY OF ELECTRONIC BUSINESS CARDS, EACH ELECTRONIC BUSINESS CARD OF THE FIRST PLURALITY OF BUSINESS CARDS BEING SPECIFIC TO A RESPECTIVE ONE USER OF A PLURALITY OF USERS AND RESPECTIVE ONE CHANNEL OF A PLURALITY OF CHANNELS, THE RESPECTIVE ONE CHANNEL BEING ASSOCIATED WITH THE RESPECTIVE ONE USERS, AND WHEREIN EACH ELECTRONIC BUSINESS CARD OF THE OF THE FIRST PLURALITY OF BUSINESS CARDS IS FOR USE BY A PLURALITY OF CHAT INITIATING PARTIES FOR ENGAGING IN A FIRST PAYCHAT SESSION WITH THE RESPECTIVE ONE USER SPECIFIC THERETO ON THE CHAT ROOM PLATFORM AND THE FIRST PAYCHAT SESSION IN VIEWABLE BY EACH CHAT INITIATING PARTY OF THE PLURALITY OF CHAT INITIATING PARTIES WHETHER OR NOT THEY WERE THE ORIGINATING CHAT INITIATING PARTY OF THE FIRST PAYCHAT SESSION, AND WHEREIN EACH ELECTRONIC BUSINESS CARD OF THE FIRST PLURALITY OF ELECTRONIC BUSINESS CARDS INCLUDES INFORMATION SPECIFIC TO THE RESPECTIVE ONE USER ASSOCIATED THEREWITH COMPRISING AT LEAST A NAME AND A SCANNABLE IDENTIFICATION CODE CONFIGURED SOLELY FOR USE WITH A PARTICULAR ONCE CHANNEL OF THE PLURALITY OF CHANNELS BUT IS VOID OF ANY PHYSICAL ADDRESS, ELECTRONIC MAIL ADDRESS, AND TELEPHONE NUMBER ASSOCIATED WITH THE RESPECTIVE ONE USER

204

RECEIVING, BY THE DLT-BASED PRIVATE BUSINESS HUB SYSTEM, FROM A USER DEVICE ASSOCIATED WITH THE PARTICULAR ONE CHAT INITIATING PARTY OF THE PLURALITY OF CHAT INITIATING PARTIES, A REQUEST TO INITIATE THE FIRST PAYCHAT SESSION ON THE CHAT ROOM PLATFORM WITH PARTICULAR ONE RESPECTIVE USER OF THE PLURALITY OF USERS USING THE ELECTRONIC BUSINESS CARD OF THE PLURALITY OF BUSINESS CARDS SPECIFIC THERETO

206

INITIATING, BY THE DLT-BASED PRIVATE SYSTEM, THE FIRST PAYCHAT SESSION BETWEEN THE PARTICULAR ONE CHAT INITIATING PARTY AND THE PARTICULAR ONE RESPECTIVE USER ON THE CHAT ROOM PLATFORM

208

TRANSFERRING, BY THE DLT-BASED PRIVATE BUSINESS HUB SYSTEM USING A PRIVATE DLT, A FIRST BUSINESS PAYCHAT PAYMENT FROM THE PARTICULAR ONE CHAT INITIATING PARTY TO THE PARTICULAR ONE RESPECTIVE USER USING A CRYPTOCURRENCY IN RESPONSE TO THE INITIATION OF THE FIRST PAYCHAT SESSION.

END

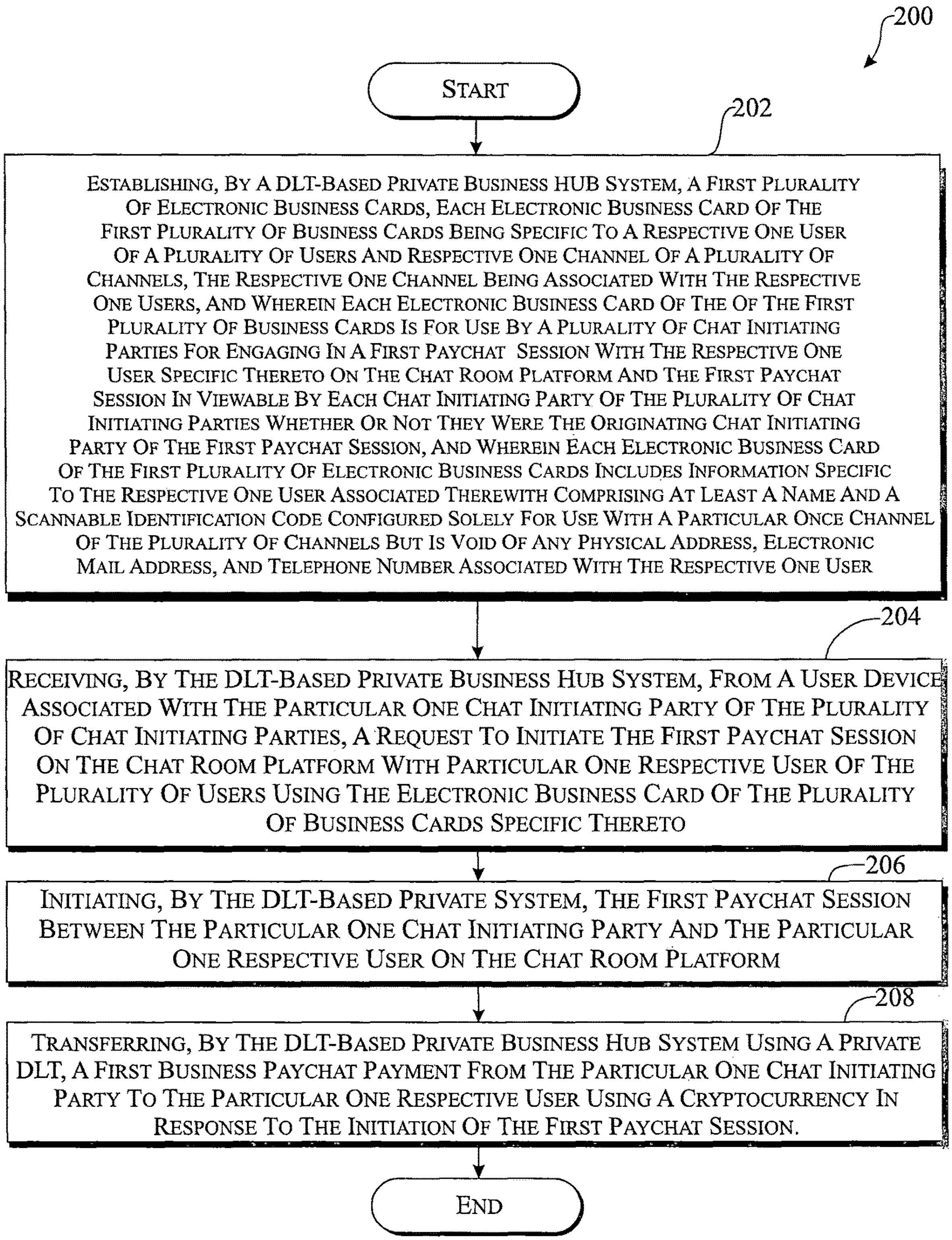

FIG. 2

ESTABLISHING, BY THE DLT-BASED PRIVATE HUB SYSTEM, A SECOND PLURALITY OF ELECTRONIC BUSINESS CARDS, EACH ELECTRONIC BUSINESS CARD OF THE SECOND PLURALITY OF ELECTRONIC BUSINESS CARDS BEING SPECIFIC TO A RESPECTIVE ONE USER OF THE PLURALITY OF ELECTRONIC BUSINESS CARDS BEING SPECIFIC TO A RESPECTIVE ONE USER OF THE PLURALITY OF USERS FOR USE IN ENGAGING THE RESPECTIVE ONE USER IN A SECOND PAYCHAT SESSION, WHEREIN EACH ELECTRONIC BUSINESS CARD OF THE SECOND PLURALITY OF ELECTRONIC BUSINESS CARDS INCLUDES INFORMATION SPECIFIC TO THE RESPECTIVE ONE USER ASSOCIATED THEREWITH COMPRISING AT LEAST A NAME AND A SCANNABLE IDENTIFICATION CODE CONFIGURED SOLEY FOR USE WITH THE SECOND PAYCHAT SESSION BUT IS VOID OF ANY PHYSICAL ADDRESS, ELECTRONIC MAIL ADDRESS, AND TELEPHONE NUMBER ASSOCIATED WITH THE RESPECTIVE ONE USER

304

RECEIVING, BY THE DLT-BASED PRIVATE BUSINESS HUB SYSTEM, FROM A USER DEVICE ASSOCIATED WITH A PARTICULAR ONE CHAT INITIATING PARTY OF THE PLURALITY OF CHAT INITIATING PARTIES, A REQUEST TO INITIATE THE SECOND PAYCHAT SESSION ON THE CHAT ROOM PLATFORM WITH A PARTICULAR ONE RESPECTIVE USER OF THE PLURALITY OF USERS USING THE ELECTRONIC BUSINESS CARD OF THE SECOND PLURALITY OF BUSINESS CARDS SPECIFIC THERETO, THE SECOND PAYCHAT SESSION BEING EXCLUSIVE BETWEEN THE PARTICULAR ONE RESPECTIVE USER AND THE PARTICULAR ONE CHAT INITIATING PARTY INITIATING HE SECOND PAYCHAT SESSION

306

INITIATING, BY THE DLT-BASED PRIVATE BUSINESS HUB SYSTEM. THE SECOND PAYCHAT SESSION BETWEEN THE PARTICULAR ONE CHAT INITIATING PARTY AND THE PARTICULAR ONE RESPECTIVE USER ON THE CHAT ROOM PLATFORM

308

TRANSFERRING, BY THE DLT-BASED PRIVATE BUSINESS HUB SYSTEM USING THE PRIVATE DLT, A SECOND BUSINESS PAYCHAT PAYMENT FROM THE PARTICULAR ONE CHAT INITIATING PARTY TO THE PARTICULAR ONE RESPECTIVE USER USING THR CRYPTOCURRENCY IN RESPONSE TO THE INITIATION OF THE SECOND PAYCHAT SESSION

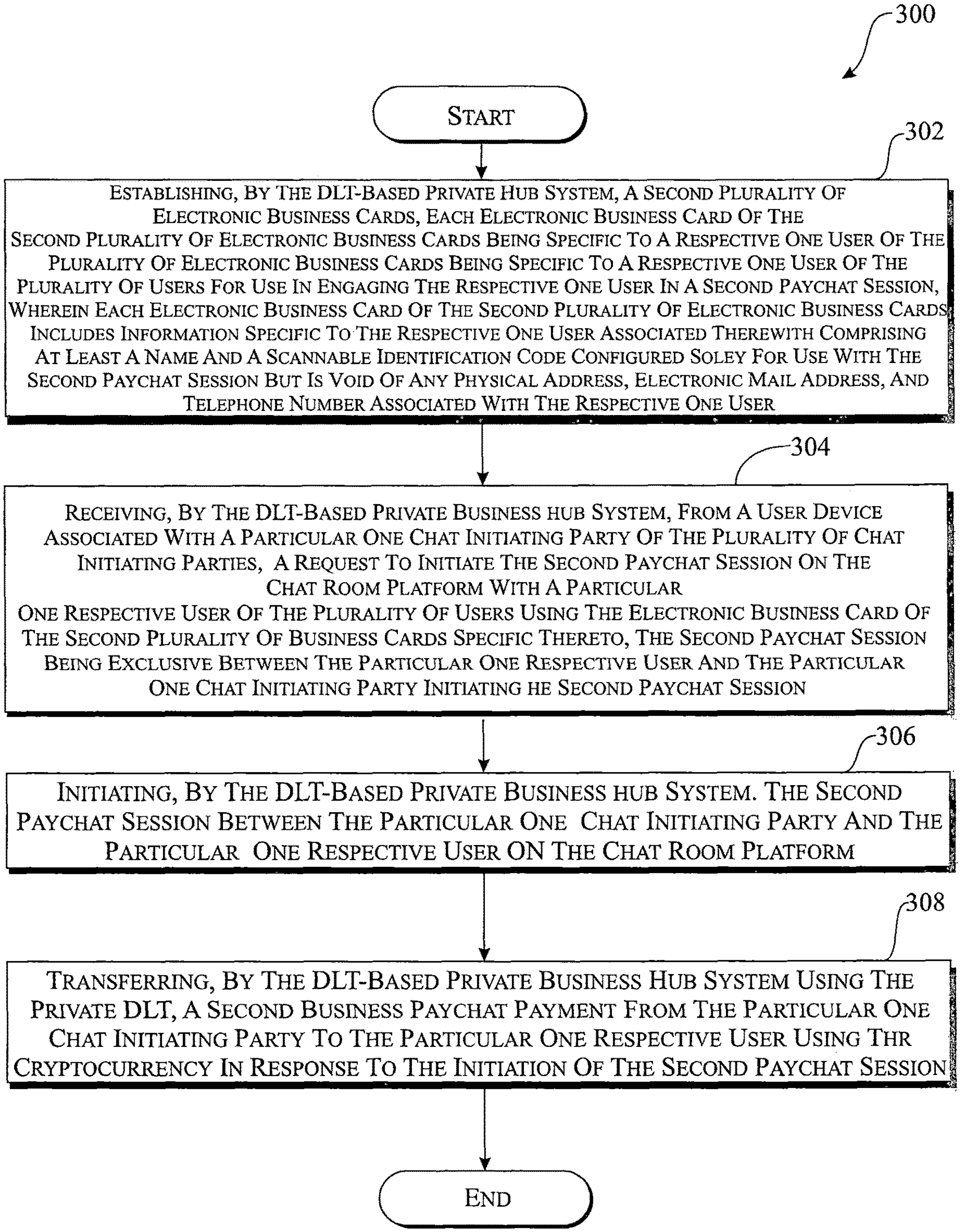

FIG. 3

DLT-BASED PRIVATE BUSINESS HUB SYSTEM HAVING A PAYCHAT PLATFORM

CROSS-REFERENCE TO RELATED APPLICATION

This application claims the benefit of U.S. Provisional Patent Application 63/413,059 filed Oct. 4, 2022, which is hereby incorporated by reference herein in its entirety.

FIELD OF THE INVENTION

The present invention relates generally to chat rooms, and more particularly, to a digital ledger technology (DLT)-based private business hub system comprising a chat platform.

BACKGROUND OF THE INVENTION

Chat and chat system technology, commonly referred to as online chat, allows users to communicate in near-real time over a communications network (e.g., the Internet or an intranet) through the transmission of text messages from sender to receiver. The most common forms of online chat are direct, one-to-one chat, commonly referred to as instant messaging (or "IM"), texting, and chat rooms. A chat room allows multiple users to communicate synchronously within the confines of the chat room. A chat room is a virtual space allowing chat between users who are in the same chat room. Chat messages are generally short in order to enable other participants to respond quickly given a feeling similar to a spoken conversation, which distinguishes chatting from other text-based online communication forms such as Internet forums and email. In general, chat rooms are to some extent organized around a particular type of user, interest, or topic and more users in a chat room typically results in a livelier, more interesting conversation. User interactions in chat room systems include entering a particular chat room as an active user to type in messages and/or view messages, replying to messages in a chat room, saving messages displayed during a chat session, and switching to a different chat room. When a user is interested in conversing with other users (i.e., participants) in a particular chat room, the user enters the room either as a registered user or as a guest. Typically, each participant in a particular chat room sees a message window for that chat room and participants'. messages appear in the message window in the order that the messages are posted. A user can respond to a recent message by posting a reply in a response dialog box. In a chat client application, the newest messages are usually displayed either at the top or bottom of the message window. A message window will display a predetermined number of messages. When the maximum number of messages is reached, older messages are scrolled off the message window to make room for newer messages as they are posted.

Further, a client program (called a chat client) is typically used to participate in chat communication. A user typically types text in a chat client and the typed text is passed, by a chat service, to the chat client of each user in the communication (e.g., in the same chat room). Chat communication may be communication between, and only visible to, two users, multiple users, and/or groups of users. In persistent chat, a chat room is created and made persistent, (i.e., it remains in existence even when it is not being used for a chat communication and/or no user is present in the chat room). The chat communication in a persistent chat room may remain in the chat room for a period of time after the chat communication occurred, including being retained and/or archived.

In today's increasingly digital-based world, the use of individual chat and chat rooms are widespread given the major advances in the communications field and is typically employed for personal communications and/or business communications between different individuals and/or groups of individuals. One aspect that is not currently pervasive in the use of chat and chat rooms is the monetization of an individual's chat or expertise in responding to chat requests. For example, in the medical field, the use of chat communications by a physician with their patient and charging their professional fee for the medical consultation and access is a somewhat foreign concept. The lack of monetization aspects for users is generally true with respect to both business chat and personal chat. The same type of chat monetization can be done for consultants, attorneys, and even just speaking to a celebrity directly.

Accordingly, there is a need for a chat platform that facilitates the exchange of personal and business chats allowing for the monetization thereof by users.

SUMMARY OF THE INVENTION

The present invention is directed to a distributed ledger technology (DLT)-based private business hub system comprising a chat platform. More particularly, in an aspect, a DLT-based private business hub system comprising a blockchain-based paychat platform that facilitates various chat exchanges and the monetization thereof.

In a first implementation of the invention, a method for implementing a chat room platform is provided comprising the operations of at least: (i) establishing, by a DLT-based private business hub system, a first plurality of electronic business cards, each electronic business card of the first plurality of business cards being specific to a respective one user of a plurality of users and a respective one channel of a plurality of channels, the respective one channel being associated with the respective one user, and wherein each electronic business card of the first plurality of business cards is for use by a plurality of chat initiating parties for engaging in a first paychat session with the respective one user specific thereto on the chat room platform and the first paychat session is viewable by each chat initiating party of the plurality of chat initiating parties whether or not they were the originating chat initiating party of the first paychat session, and wherein each electronic business card of the first plurality of electronic business cards includes information specific to the respective one user associated therewith comprising at least a name and a scannable identification code configured solely for use with a particular one channel of the plurality of channels but is void of any physical address, electronic mail address, and telephone number associated with the respective one user; (ii) receiving, by the DLT-based private business hub system, from a user device associated with a particular one chat initiating party of the plurality of chat initiating parties, a request to initiate the first paychat session on the chat room platform with a particular one respective user of the plurality of users using the electronic business card of the first plurality of business cards specific thereto; (iii) initiating, by the DLT-based private business hub system, the first paychat session between the particular one chat initiating party and the particular one respective user on the chat room platform; and (iv) transferring, by the DLT-based private business hub system using a private DLT, a first paychat payment from the particular one chat initiating party to the particular one respective user using a cryptocurrency in response to the initiation of the first paychat session.

In a second aspect, a DLT-based private business hub system is provided for facilitating and providing for the implementing of a chat room platform. The system comprising at least: a processor and a memory storing instructions that when executed cause the processor to perform operations comprising at least: (i) establishing, by a DLT-based private business hub system, a first plurality of electronic business cards, each electronic business card of the first plurality of business cards being specific to a respective one user of a plurality of users and a respective one channel of a plurality of channels, the respective one channel being associated with the respective one user, and wherein each electronic business card of the first plurality of business cards is for use by a plurality of chat initiating parties for engaging in a first paychat session with the respective one user specific thereto on the chat room platform and the first paychat session is viewable by each chat initiating party of the plurality of chat initiating parties whether or not they were the originating chat initiating party of the first paychat session, and wherein each electronic business card of the first plurality of electronic business cards includes information specific to the respective one user associated therewith comprising at least a name and a scannable identification code configured solely for use with a particular one channel of the plurality of channels but is void of any physical address, electronic mail address, and telephone number associated with the respective one user; (ii) receiving, by the DLT-based private business hub system, from a user device associated with a particular one chat initiating party of the plurality of chat initiating parties, a request to initiate the first paychat session on the chat room platform with a particular one respective user of the plurality of users using the electronic business card of the first plurality of business cards specific thereto; (iii) initiating, by the DLT-based private business hub system, the first paychat session between the particular one chat initiating party and the particular one respective user on the chat room platform; and (iv) transferring, by the DLT-based private business hub system using a private DLT, a first paychat payment from the particular one chat initiating party to the particular one respective user using a cryptocurrency in response to the initiation of the first paychat session.

In a third aspect, a user device is provided and configured for interfacing with the DLT-based private business hub system and chat room platform services thereof. The user device comprising at least a processor, a display and a memory storing instructions that when executed cause the processor to perform operations comprising at least: (i) establishing a communication between a user device (e.g., a mobile device) and the DLT-based private business hub system; (ii) accessing, a first plurality of electronic business cards, each electronic business card of the first plurality of business cards being specific to a respective one user of a plurality of users and a respective one channel of a plurality of channels, the respective one channel being associated with the respective one user, and wherein each electronic business card of the first plurality of business cards is for use by a plurality of chat initiating parties for engaging in a first paychat session with the respective one user specific thereto on the chat room platform and the first paychat session is viewable by each chat initiating party of the plurality of chat initiating parties whether or not they were the originating chat initiating party of the first paychat session, and wherein each electronic business card of the first plurality of electronic business cards includes information specific to the respective one user associated therewith comprising at least a name and a scannable identification code configured solely for use with a particular one channel of the plurality of channels but is void of any physical address, electronic mail address, and telephone number associated with the respective one user; (iii) transmitting, from the user device associated with a particular one chat initiating party of the plurality of chat initiating parties to the private hub business hub system, a request to initiate the first paychat session between the particular one chat initiating party and the particular one respective user on the chat room platform; (iii) engaging in the first paychat session initiated by the DLT-based private business hub system between the particular one chat initiating party and the particular one respective user on the chat room platform; and (iv) authorizing, through the DLT-based private business hub system using a private DLT, a first paychat payment from the particular one chat initiating party to the particular one respective user using a cryptocurrency in response to the initiation of the first paychat session.

In a fourth aspect, a paychat platform application (alternatively referred to herein as an "app") is provided for implementing and accessing a chat room platform that facilitates monetization of certain chat session types comprising the operations of at least: (i) establishing, by a DLT-based private business hub system, a first plurality of electronic business cards, each electronic business card of the first plurality of business cards being specific to a respective one user of a plurality of users and a respective one channel of a plurality of channels, the respective one channel being associated with the respective one user, and wherein each electronic business card of the first plurality of business cards is for use by a plurality of chat initiating parties for engaging in a first paychat session with the respective one user specific thereto on the chat room platform and the first paychat session is viewable by each chat initiating party of the plurality of chat initiating parties whether or not they were the originating chat initiating party of the first paychat session, and wherein each electronic business card of the first plurality of electronic business cards includes information specific to the respective one user associated therewith comprising at least a name and a scannable identification code configured solely for use with a particular one channel of the plurality of channels but is void of any physical address, electronic mail address, and telephone number associated with the respective one user; (ii) receiving, by the DLT-based private business hub system, from a user device associated with a particular one chat initiating party of the plurality of chat initiating parties, a request to initiate the first paychat session on the chat room platform with a particular one respective user of the plurality of users using the electronic business card of the first plurality of business cards specific thereto; (iii) initiating, by the DLT-based private business hub system, the first paychat session between the particular one chat initiating party and the particular one respective user on the chat room platform; and (iv) transferring, by the DLT-based private business hub system using a private DLT, a first paychat payment from the particular one chat initiating party to the particular one respective user using a cryptocurrency in response to the initiation of the first paychat session.

In a further aspect, there is a prompting, prior to the initiation of the first paychat session, the particular one chat initiating party with a message comprising a specific charge for the first paychat payment for the first paychat session, and wherein the first paychat session is initiated only if the particular one chat initiating party agrees to the specific charge in the message for the first paychat payment.

In a further aspect, there is receiving, in response to the message, the particular one chat initiating party's acceptance to the specific charge for the first paychat payment.

In a further aspect, there is the implementation of a second paychat session by establishing, by the DLT-based private business hub system, a second plurality of electronic business cards, each electronic business card of the second plurality of electronic business cards being specific to a respective one user of the plurality of users for use in engaging the respective one user in a second paychat session, wherein each electronic business card of the second plurality of electronic business cards includes information specific to the respective one user associated therewith comprising at least a name and a scannable identification code configured solely for use with the second paychat session but is void of any physical address, electronic mail address, and telephone number associated with the respective one user; receiving, by the DLT-based private business hub system, from a user device associated with a particular one chat initiating party of the plurality of chat initiating parties, a request to initiate the second paychat session on the chat room platform with a particular one respective user of the plurality of users using the electronic business card of the second plurality of business cards specific thereto, the second paychat session being exclusive between the particular one respective user and the particular one chat initiating party initiating the second paychat session; initiating, by the DLT-based private business hub system, the second paychat session between the particular one chat initiating party and the particular one respective user on the chat room platform; and transferring, by the DLT-based private business hub system using the private DLT, a second paychat payment from the particular one chat initiating party to the particular one respective user using the cryptocurrency in response to the initiation of the second paychat session.

In a further aspect, there is prompting, prior to the initiation of the second paychat session, the particular one chat initiating party with a message comprising a specific charge for the second paychat payment for the second paychat session, and wherein the second paychat session is initiated only if the particular one chat initiating party agrees to the specific charge in the message for the second paychat payment.

In another aspect, there is transferring, by the DLT-based private business hub system using the private DLT, the first business paychat payment from each of the other chat initiating parties of the plurality of chat initiating parties engaging in the first paychat session using the cryptocurrency in response to the initiation of the first paychat session.

In a further aspect, the cryptocurrency is an in-app cryptocurrency adopted for use with the private DLT.

In a further aspect, the cryptocurrency is associated with a public DLT.

In a further aspect, the cryptocurrency is one of: Bitcoin (BTC), Ethereum (ETH), Binance Coin (BNB), Tether (USDT), Solana (SOL), XRP (XRP), Cardano (ADA), USD Coin (USDC), Binance USD (BUSD), and Avalanche (AVAX).

In a further aspect, the DLT-based private business hub system is a blockchain-based DLT and the private DLT is a blockchain.

In a further aspect, the public DLT is a blockchain.

In a further aspect, there is providing, by the DLT-based private business hub system using the private DLT, a plurality of digital wallets, each digital wallet of the plurality of wallets being specific to either one of the plurality of users or one of the plurality of chat initiating parties.

In a further aspect, there is the implementation of a business paychat session by establishing, by the DLT-based private business hub system, a third plurality of electronic business cards, each electronic business card of the third plurality of electronic business cards being specific to a respective one user of the plurality of users for use in engaging the particular one user in a business paychat session, wherein each electronic business card of the third plurality of electronic business cards includes information specific to the respective one user associated therewith comprising at least a name, a physical address, an electronic mail address, a telephone number, and a scannable identification code configured solely for use with the business paychat session; receiving, by the DLT-based private business hub system, from a user device associated with a particular one chat initiating party of the plurality of chat initiating parties, a request to initiate the business paychat session on the chat room platform with a particular one respective user of the plurality of users using the electronic business card of the third plurality of business cards specific thereto, the business paychat session being exclusive between the particular one respective user and the particular one chat initiating party initiating the business paychat session; and initiating, by the DLT-based private business hub system, the business paychat session between the particular one chat initiating party and the particular one respective user on the chat room platform.

In a further aspect, there is receiving, by the DLT-based private business hub system, from a user device associated with a particular one chat initiating party of the plurality of chat initiating parties, a request to initiate a personal chat session on the chat room platform with a particular one respective user of the plurality of users, the personal chat session being exclusive between the particular one respective user and the particular one chat initiating party initiating the personal chat session; and initiating, by the DLT-based private business hub system, the personal chat session between the particular one chat initiating party and the particular one respective user on the chat room platform.

In a further aspect, the first paychat payment transferred is from a first digital wallet associated with the particular one chat initiating party to a second digital wallet associated with the particular one respective user, wherein the first digital wallet and the second digital wallet are private digital wallets managed by the private DLT.

In a further aspect, at least one of the first paychat session and the second paychat session is for a specific time duration. In a further aspect, the specific time duration is defined by the user.

In a further aspect, at least one of the first paychat payment and the second paychat payment is determined using a variable rate.

In a further aspect, there is adjusting, in real-time, the variable rate. In a further aspect, the variable rate adjustments are specified by the user (i.e., the individual who created the private chat such as a consultant, expert and/or celebrity).

In a further aspect, there is the implementation of a speed network function by registering, by the DLT-based private business hub system, a subset of the plurality of chat initiating parties for a speed network, wherein the speed network is exclusive to the subset of the plurality of chat initiating parties registered and a specific industry or specialty; receiving, by the DLT-based private business hub system, a speed network chat session request from a particular one chat initiating party of the subset of the plurality of chat initiating parties; and responsive to the speed network chat session received, automatically initiating, by the DLT-based private business hub system, the speed network chat session between the particular one chat initiating party registered and the other chat initiating parties of the subset of the plurality of chat initiating parties registered.

In a further aspect, the paychat platform app may be a mobile application executing on a user device. In a further aspect, the user device may be a mobile device, smartphone, laptop computer, tablet and/or wearable device.

In a further aspect, the paychat payments may be made using a designated currency. In a further aspect, the designated currency may be either a cryptocurrency or a fiat currency (paper currency form, digital currency form, or otherwise, for example, U.S. dollars (USD)).

These and other objects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which:

FIG. 2 presents a flowchart of illustrative operations for implementing a blockchain-based paychat platform and paychat sessions between one party and many other parties involving channels in accordance with an embodiment;

FIG. 3 presents a flowchart of illustrative operations for implementing a blockchain-based paychat platform and paychat sessions that are exclusive between two parties in accordance with an embodiment;

Like reference numerals refer to like parts throughout the several views of the drawings.

DETAILED DESCRIPTION

Figure 1:
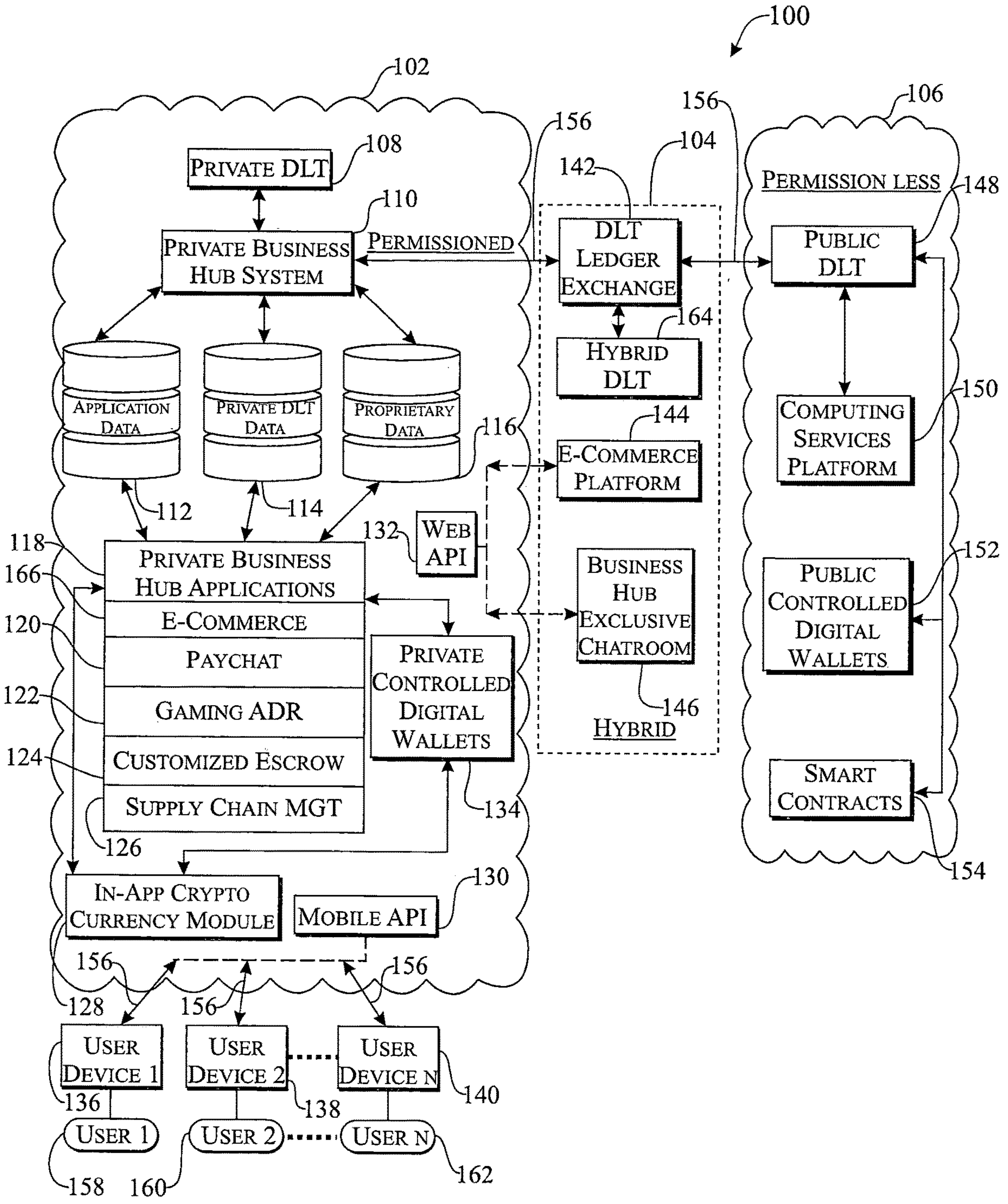
FIG. 1 presents a high-level block diagram of a network architecture for providing a blockchain-based private business hub system comprising a blockchain-based paychat platform in accordance with an embodiment.

The following detailed description is merely exemplary in nature and is not intended to limit the described embodiments or the application and uses of the described embodiments. As used herein, the word “exemplary” or “illustrative” means “serving as an example, instance, or illustration.” Any implementation described herein as “exemplary” or “illustrative” is not necessarily to be construed as preferred or advantageous over other implementations. All the implementations described below are exemplary implementations provided to enable persons skilled in the art to make or use the embodiments of the disclosure and are not intended to limit the scope of the disclosure, which is defined by the claims. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Shown throughout the figures, the present invention is directed toward a DLT-based private business hub system comprising a chat platform that enable paychats (and the monetization thereof), business chats, and personal chats between a variety of parties. More particularly, the chat exchanges occur across a chat room platform delivered and enabled by a DLT-based private business hub system and paychat platform application that enable chat communications falling into four (4) main categories: (1) one-to-one paychats; (2) one-to-many paychats; (3) business chats; and (4) personal chats. As such, these different chat mechanisms enable communications in a centralized manner or in a decentralized manner. Said another way, a chat happens on a private blockchain which is centralized, using the overall platform, which is a hybrid, so it can be said this is done in a centralized manner “hybridized” to show payments only on a decentralized manner. In an aspect, the persona chats serve as a funnel into the private business hub platform and chat platform. These communication types are configured such that each one escalates in a ladder of exclusivity (with or without monetization). For example, the personal chats provide no monetization and no separation from you and the other party (e.g., a client). Further, these communication types also serve a purpose in an auto-referral multi-layer marketing (MLM) structure hereinunder that provides a revenue generation mechanism for new user referrals that are made by existing user(s). A business chat provides more separation (than the personal chat) between you and the other party and facilitates colleagues sharing information with each other, for example, and supporting business networking. Each paychat type provides even further separation between you and the other party because the other party will not have access to any of your information except your name, and confirmation they have joined the paychat with you. Further, these paychat sessions are capable of being monetized thereby generating a revenue stream for a user(s). As used herein, the term "paychat" (or "paychats") refers to two distinct types of paychats: (i) a paychat(s) where you as an individual are paying others to engage in the chat(s); and (ii) a paychat(s) where you are being paid by other individuals to engage in the chat(s). In addition, the paychats may be understood to be directed a first paychat type (i.e., one-to-many paychat) utilizing electronic business cards that include information specific to a respective user comprising at least a name and a scannable identification code configured solely for use with a particular one channel of the plurality of channels but is void of any physical address, electronic mail address, and telephone number associated with the user. As used herein, the term "channel" refers to a chat mechanism whereby the user establishes a specific channel for each chat thread they wish to engage with others with respect to a defined domain (e.g., a professional domain). For example, a user may be engaged in several business ventures and will create a dedicated channel for each business ventures in order to engage with others for business paychat sessions whereby each such business paychat session across that particular channel is viewable by all parties having access to that channel (e.g., the chat initiating parties) so they may also engage in any one business paychat session across that channel. In this way, each such electronic business card may be used by a plurality of chat initiating parties for engaging in the first paychat session type with the user on the chat room platform using a particular channel such that this first paychat session type is viewable by each chat initiating party of the plurality of chat initiating parties whether or not they were the originating chat initiating party of the first paychat session (said another way, a one-to-many channel paychat). The second paychat type (i.e., one-to-one paychat) utilizes electronic business cards that include information specific to the user comprising at least a name and a scannable identification code configured solely for use with the second paychat session type but is void of any physical address, electronic mail address, and telephone number associated with the user, and the second paychat session type being exclusive between the user and the particular one chat initiating party initiating such second paychat session type. Each of the first paychat session type and the second paychat session type employs a respective user ID. No channel is employed or required in this second paychat type.

In further aspects, the "chat(s)" hereunder may involve so-called "business chat(s)" directed to a business or professional aspect and/or so-called "personal chat(s)" directed to one-on-one personal chats between two (2) respective individuals that are not fee-based or monetized. A business chat type employs electronic business cards that are specific to a user and are for use in engaging the user in a "no fee" business paychat session in accordance with an embodiment. Each electronic business card for use with the business chat type includes information specific to the user associated therewith comprising at least a name, a physical address, an electronic mail address, a telephone number, and a scannable identification code configured solely for use with the business paychat session. Thus, in contrast to the electronic business cards used for the paychats, these electronic cards divulge a larger amount of information about the user to other parties.

In accordance with the disclosed embodiments, the chat room platform provides for the monetization of the paychats. Importantly, the DLT-based private business hub system and associated method(s) of the disclosed embodiments provide advantageous improvements of practical applications including, but not limited to, communications systems, chat platforms, and blockchain-based transaction systems. In accordance with the disclosed embodiments, an individual is provided a powerful chat-based platform across which they may control the real-time chat communications flow they receive as a function of at least time (e.g., a particular time or day) and a rate (e.g., variable rates based on the type of individuals wishing to contact them and/or based on the particular time or day of the chat). As such, the individual is able establish the monetization of their access and time (through the paychat types) by other individuals seeking to contact them. This provides a strict control feature such that individuals may control by whom and when they are contacted and for what purpose, all in the context of a paychat monetization platform.

To provide further context for the subject disclosure, a high-level discussion of DLT, blockchains, and smart contracts will now be discussed. A blockchain is a distributed database that records all transactions that have ever occurred in a network, for example. Blockchain was originally introduced for Bitcoin (a peer-to-peer digital payment system), but then evolved to be used for developing a wide range of decentralized applications. A blockchain is a distributed digital ledger which is communicated electronically between hardware devices. Each transaction recorded within the digital ledger is a block which can be hashed or otherwise encrypted. As new transactions are added to the digital ledger, each transaction's veracity can be tested against the previous ledger stored by the devices. In some configurations, there may be a requirement that some fixed percentage (e.g., fifty percent (50%)) of the user devices must confirm the transaction's veracity before being added to the blockchain. As such, a blockchain is a distributed database that records all transactions that have ever occurred in the blockchain network. This database is replicated and shared among the network's participants (or a subset thereof in some implementations). The main feature of blockchain is that it allows untrusted participants to communicate and send transactions between each other in a secure way without the need of a trusted third party. In this way, blockchain is an ordered list of blocks, where each block is identified by its cryptographic hash. Each block references the block that came before it, resulting in a chain of blocks. Each block consists of a set of transactions. Once a block is created and appended to the blockchain, the transactions in that block cannot be changed or reverted. This is to ensure the integrity of the transactions, for example, any smart contract applications in accordance with the principles of the embodiments herein.

In essence, as noted previously, a blockchain is a transaction ledger that maintains identical copies across each computer of a member network and the fact that the ledger is distributed across part of the network facilitates the security of blockchain. A blockchain relies on three important components: private key technology, a distributed network that includes a shared ledger, and an accounting means for the transactions and records across the network. A blockchain is a list of records that are cryptographically linked together such that each block of the blockchain contains a cryptographic hash of the previous block, a timestamp, and transaction data. Thus, a blockchain is highly resistant to date modification due to the design feature that once recorded the data in any given block cannot be altered without alteration of all subsequent blocks. In many applications, the constructed distributed ledger is managed within a peer-to-peer network that allows participants to verify and audit transactions in an efficient manner. By combining the use of cryptographic keys with a distributed network, blockchain expands the type and number of digital transaction possibilities.

One appealing application that can be deployed on top of blockchain are so-called smart contracts. A smart contract is executable code that runs on the blockchain to facilitate, execute, and enforce the terms of an agreement between parties. It can be thought of as a system that releases digital assets to all or some of the involved parties once the pre-defined rules have been met. The main aim of a smart contract is to automatically execute the terms of an agreement once the specified conditions are met. Before a smart contract may process transactions, the smart contract must be deployed on the blockchain. The deployment process must guarantee that all blockchain nodes have exactly the same program code. Generally, blockchain designs employ two smart contract deployment approaches. One approach is to save the smart contract code itself in the blockchain thereby guaranteeing global node consensus (so-called "on-chain"), and the other is to allow each node owner to decide if the node should have the code installed locally and use a hash-based commitment in the blockchain as reference for validating the integrity thereof (so-called "off-chain). Smart contracts are executed by the blockchain nodes, as a result of processing transactions that are submitted by the user. A blockchain transaction has a designated smart contract function and a payload that contains input values to the function call. A transaction may be submitted at any node in the blockchain network, which broadcasts the transaction to the entire network, so all of the nodes are aware of the transaction. At a particular point, the transaction is processed by each of the nodes using the executable program code in the target smart contract. If the transaction is successful, the internal state of the blockchain will be updated. If the trigger input is determined to be invalid and rejected by the smart contract, then the overall state is not affected. For example, the smart contract may be triggered by a specific event ("if A happens, then action B"). In this way, a smart contract functions as a trusted distributed application that gains security/trust from the blockchain and the underlying consensus among the peers. Smart contracts must be independently executed by a quorum of blockchain nodes. Unlike traditional database structures, blockchains are decentralized such that every node assumes other nodes are potentially malicious and a node never trusts states maintained by other nodes in the network. Instead, each node maintains their own state database by executing the transaction itself using the smart contract code. Thus, each smart contract maintains their own set of states and transactions submitted to a blockchain may target a smart contract. Once a transaction is executed, the target smart contract updates its state and one smart contract may call another smart contract in order to query, for example, the downstream smart contract's state or update the same. Only valid transactions result in updated states and invalid transactions are either rejected by the blockchain network from being included in the blockchain or included but marked as failed depending upon the particular blockchain design. In this way, the deployed smart contract serves as a form of execution logic for a blockchain application. Thus, smart contracts promise low transaction fees compared to traditional systems that require a trusted third party to enforce and execute the terms of an agreement. There are different blockchain platforms that can be utilized to develop and deploy smart contracts, and Ethereum is a common platform for developing smart contracts.

Ethereum is a public blockchain platform that can support advanced and customized smart contracts with the help of Turing-complete programming language. Ethereum is a decentralized blockchain platform that establishes a peer-to-peer network that securely executes and verifies application code (e.g., smart contracts). Ethereum is a platform powered by blockchain technology that may be best known for its associated cryptocurrency, called ether (or ETH), or simply Ethereum. In this way, a user/sender must sign transactions and spend ETH as a cost of processing transactions on the network. Smart contracts, as previously noted, allow participants to transact with each other without a trusted central authority. Transaction records are immutable, verifiable, and securely distributed across the network, giving participants full ownership and visibility into transaction data. Transactions are sent from and received by user-created Ethereum accounts. Ethereum offers an extremely flexible platform on which to build decentralized applications using the Solidity scripting language and Ethereum Virtual Machine (EVM). The code of Ethereum smart contracts is written in a stack-based bytecode language and executed in the EVM. Several high-level languages (e.g., Solidity and Serpent) can be used to write Ethereum smart contracts. The code of those languages can then be compiled into EVM bytecodes to be executed. Decentralized application developers who deploy smart contracts on Ethereum benefit from the rich ecosystem of developer tooling and established best practices that have come with the maturity of the protocol. This maturity also extends into the quality of user-experience for the average user of Ethereum applications, with digital/cryptocurrency wallets such as MetaMask, Argent, Rainbow, and more offering simple interfaces through which to interact with the Ethereum blockchain and smart contracts deployed thereon. Ethereum's large user base encourages developers to deploy their applications on the network, which further reinforces Ethereum as the primary platform for decentralized applications like decentralized finance (DeFi), decentralized applications (dApps), and non-fungible tokens (NFTs). The distributed nature of blockchain technology is what makes the Ethereum platform secure, and that security enables ETH to accrue value.

In a preferred embodiment, a private permissioned blockchain provides certain advantages. In particular, Quorum and Hyperledger Fabric. Quorum is an open source project founded by JP Morgan, providing an implementation of Ethereum tailored to enterprise blockchain networks. Quorum is based on the Ethereum protocol and can support a wide range of decentralized applications and smart contracts. It is also highly modular and customizable so that it can be tailored to the needs of specific use cases. For example, Quorum is a modular and customizable DLT and smart contract platform that is built on top of the Ethereum virtual machine and may be thought of as a layer 2 solution in the context of the Ethereum chain, but it may also function as a layer 1 solution by using it as a stand-alone solution with its own coin, as opposed to the Ethereum coin, thereby establishing a network's specific coin. Quorum is designed to be highly scalable, with low transaction latencies and the ability to support a higher number of transactions per second than other blockchain protocols. This makes it well-suited for use in high-volume applications such as e-commerce. The Quorum blockchain is a permissioned or private DLT having a primary purpose of providing a permissioned implementation of the Ethereum blockchain that supports contract privacy and transactions. It places a strong emphasis on contract privacy and transaction security. Notably, the blockchain architecture further includes a so-called "private transaction identifier" feature that ensures data privacy. This feature allows network participants to conduct private transactions without revealing the details of those transactions to the entire network. Quorum includes a number of security features that are designed to protect sensitive or proprietary data, like private transactions that allow network participants to transact without revealing the details of their transactions to the rest of the network. Further, there is no cost required to submit transactions to a Quorum network, unlike Ethereum, which requires the payment of high and unpredictable gas fees to submit transactions. In an enterprise blockchain network it is common that some data cannot be shared with all participants. Thus, one of the advantages of Quorum, especially in enterprise settings, is its cost-effectiveness. Unlike Ethereum, which requires the payment of potentially high and unpredictable gas fees to submit transactions, Quorum allows transactions to be submitted without transaction costs. In scenarios where certain data cannot be shared with all participants, This privacy feature is crucial for businesses and applications that require secure and confidential transactions. For example, the ability to show the details of a legal dispute to the parties involved, but to the world, only show that a transaction has occurred, where the details of the settlement can be revealed by the parties if desired, referencing the transaction that occurred. Furthermore, Quorum maintains compatibility with Ethereum APIs and the smart contract programming model, enabling seamless integration of private blockchain transactions with those that are visible to all participants. This makes it a versatile choice for various enterprise applications, including those designed as mobile-based app architectures. Quorum provides a model where encrypted data can be exchanged privately between participants and stored privately in an enclave of only those participants allowed to see that data. The same Ethereum APIs and smart contract programming model is used to perform these private Blockchain transactions, as the transactions that are visible to all the participants. Illustratively, in a preferred embodiment the private DLT 108 may employ a private blockchain architecture designed using Quorum for enterprise applications requiring secure, high-performance transaction processing in a private network as well as the gaming ADR app 900 (or any of the other private business applications 118) which is designed may be designed as a mobile-based app architecture in various embodiments. Given the ability to provide privacy, security, scalability, and cost-efficiency in high volume applications, Quorum is ideally suited in the preferred embodiment to form a complete ecosystem that includes a dispute management mechanism utilizing alternative, private, and confidential contracts and ensuring the finality of settlement details remain private unless disclosure is authorized by the involved parties. Further, in the context of high-volume settings, the need for faster transaction confirmation is paramount making Quorum's consensus mechanism (as opposed to the traditional proof-of-work used by Ethereum, for example) that ensures rapid confirmation and substantially lower transaction costs ideal for the expected activity volume of the private business hub system 110. Moreover, while blockchain technology inherently prevents many disputes, Quorum offers an innovative approach to dispute management through the utilization of finality. In terms of the preferred embodiment hereunder, Quorum provides certain advantages: (1) Scalability and Performance: Quorum's architecture is designed for high scalability and low-latency transactions. In applications heavily driven by e-commerce and interactions, where every second matters, Quorum's ability to handle a high volume of transactions per second is a significant advantage; (2) Contract Privacy and Confidentiality: Quorum's robust support for contract privacy and transaction confidentiality was a key factor. Our application necessitates secure, confidential transactions, especially for processes like supply chain management and escrow management. Quorum's "'private transaction identifier: feature is a strong fit for the use case herein, enabling secure data sharing among authorized parties. (3) Cost-Efficiency: Unlike Ethereum, which imposes gas fees on transactions, Quorum enables the submission of transactions without incurring costs. This cost-effectiveness is valuable, especially in applications where microtransactions and frequent interactions are common; (4) Compatibility and Ease of Integration: Quorum's compatibility with Ethereum APIs and smart contract programming offered a seamless transition, allowing for leveraging existing knowledge and tools. (5) Privacy and Data Protection: In scenarios in which sensitive data must not be shared with all participants, Quorum's model for exchanging encrypted data privately and securely among selected parties, while keeping it hidden from the rest of the network, aligns well with the platform requirements herein; and (6) Mobile App Enablement: Quorum's versatility made it a natural choice for a mobile-based application. Its performance, scalability, and support for privacy-enhanced transactions make it well-suited for delivering a smooth user experience on mobile devices. As such, Quorum's scalability, performance, privacy, and cost-effectiveness, along with its compatibility with Ethereum standards, are particularly well-suited for the mobile-based application herein as well as Quorum's ability to meet specific needs in terms of e-commerce, escrow management, and privacy for the platform hereunder.

In terms of the overall platform architecture hereunder, certain security aspects may be implemented in order to ensure the safety of the user funds (e.g., their cryptocurrency) held by and used by the private business hub system 110, for example. Quorum is designed for enterprise blockchain networks and therefore places a strong emphasis on security and privacy. These security measures collectively ensure the robustness and integrity of the Quorum blockchain, making it a secure and reliable choice for enterprise-level applications, including e-commerce and escrow management processes. These security features include at least the following:

i. Byzantine fault tolerant system and associated algorithm complemented by a HotStuff mechanism for finality of transactions to ensure the reliability and integrity of transactions. This combination helps prevent malicious actions and maintains consensus even in the presence of faulty or malicious nodes.
ii. Reliable validator nodes (e.g., firewall on all permissioned validator nodes). Validator nodes are maintained with a high level of reliability including implementing robuts firewall features on all permissioned validator nodes to protect against unauthorized access and malicious intrusions.
iii. Elliptic Curve Digital Signature Algorithm (ECDSA) signature scheme for protecting transactions. ECDSA is a widely recognized cryptographic method for ensuring the authenticity and integrity of transactions.
iv. Noise protocol used to prevent validator node from implementing another validator node and to secure their network communications. In this way, noise protocol is integrated to enhance the security of validator nodes. This protocol prevents nodes from masquerading as legitimate validators and ensures secure communications among nodes in the network.

v. Incident response readiness is a well-defined incident response plan, even though the likelihood of a malicious event is extremely low. In the event of a significant portion of validator nodes behaving maliciously and potentially causing a fork, the network has protocols in place for temporarily halting the processing of transactions and determining the extent of damage from the attack;

vi. Request encryption—client-side encryption and server side decryption for protecting sensitive data during transmission and processing.

vii. Secured authentication: (a) prevention of multiple logins using the same credentials to mitigate unauthorzed account sharing; and (b) two factor authentication (2FA) for an added layer of user verification.

viii. Server side CAPTCHA on log-in that incorporates CAPTCHA mechanisms during login procedures to deter automated and malicious login attempts.

ix. JSON web-based token encryption for safeguarding tokens and authentication data and reducing the risk of token theft and misuse.

x. Other protections: Quorum employs a comprehensive set of security measures to protect against various threats, including:—Defense against distributed denial-of-service attacks (DDoS).—Mitigation of NoSQL injection attacks.—Prevention of cross-site scripting (CSS) vulnerabilities.—Safeguards against JavaScript in the browser console (Self XSS).

Protection against server-side request forgery (SSRF) attacks.—Countermeasures against HTTP parameter pollution attacks.—Defense against file inclusion vulnerabilities.

Another blockchain platform that may be used in a further embodiment is the Hyperledger Fabric (also referred to as "Fabric") as established by the Linux Foundation (see, e.g., LFS272: Hyperledger Fabric Administration, version 8.24, dated May 26, 2021) with a major focus on enterprise uses that require participants to be identified/identifiable, permissioned networks, high transaction throughput performance, low latency of transaction confirmation and privacy and confidentiality of transactions and data pertaining to business transactions. Fabric is the first distributed ledger platform to support smart contracts authored in general-purpose programming languages such as Java, rather than domain-specific languages (DSL). As such, enterprises can more easily develop smart contracts without the need to learn a specific/new programming language. The Fabric platform is also permissioned in that, unlike a public permissionless network, the participants are known to each other, rather than anonymous and therefore fully untrusted. This means that while the participants may not fully trust one another (e.g., if they are adverse parties or competitors) a network can be operated under a governance model that is constructed as a function of whatever trust does exist between participants, such as a legal framework. These features make Fabric one of the better performing platforms that are currently available both in terms of transaction processing and transaction confirmation latency. Further, this platform enables privacy and confidentiality of transactions and smart contracts that implement them. As further discussed herein below, an embodiment of the present invention may employ Hyperledger Besu and as the platform scales, the underlying architecture may transition to Hyperledger Fabric. As will be appreciated, Hyperledger Besu already has an Ethereum layer, so transferring tokens is easy to set up as well as any multi-level marketing (MLM) structure for use by the platform hereunder. However, in embodiments herein involving supply chains and the escrow management processes (see, e.g., supply chain management application 126 and/or the customized escrow management application 124), viewing the supply chains altogether at once by all parties, can cause a massive processing slowdown, so the solution is to create channels where only certain parties can view their supply chains. This channel construct is best facilitated by Hyperledger Fabric in an embodiment. Hyperledger Fabric, however, then requires creation of a wrapped token to transfer the payment token hereunder, because Fabric does not inherently have a token sending ability. So, a payment token may have to be minted while in Fabric and sent within Fabric, then when someone exits, the wrapped payment token is burned, and the person given the token. Additionally, whether Quorum, Hyperledger Fabric or Hyperledger Besu is employed, a well-known Merkle Tree is incorporated to package transactions in the platform hereunder to ensure that all data is organized and securely pushed to an Ethereum blockchain in the Merkle Tree format, and the blockchain will hold the genealogy of the MLM of the applicable revenue sharing structure (e.g., in a centralized MLM control panel) so that each and every person invited by a particular user will allow for that user to earn a portion of the revenue generated for the platform based on the referrals that the user brought into the system for a lifelong residual income (or have multiple streams of income, and one being this residual income) they generate from the platform hereunder, as further detailed herein below. In this way, the blockchain serves as the repository for the genealogy of the MLM structure, which includes a centralized MLM control panel. This structure allows every person invited by a particular user to contribute to that user's revenue thereby generating lifelong residual income or multiple income streams.

Fabric has been specifically designed with a modular architecture making it very adaptable and customizable for various use cases. The modular components include (i) a pluggable ordering service that established consensus on the order of transactions and then broadcasts blocks to peers; (ii) a pluggable membership service provider that is responsible for associating entities in a network with cryptographic identities; (iii) smart contracts (so-called chain code) run within a contained environment for isolation and can be written in standard programming languages; (iv) the ledger can be configured to support a variety of database management systems (DBMS); and (v) a pluggable endorsement and validation policy enforcement can be independently configured per application.

Further, encrypted data in the form of NFTs may be employed across a blockchain. Illustratively, NFTs may be utilized and sold, for example, as part of the e-commerce platform 144 and it will use the private blockchain. As will be appreciated, an NFT is a unit of data stored on a digital ledger (as described above), that certifies a digital asset to be unique and therefore not interchangeable. NFTs are digital assets that can be used to represent items including, not limited to, photos, videos, audio, property, and other types of digital files. Currently, NFTs are bought and sold online, frequently with cryptocurrency, and they are generally encoded with the same underlying software as many cryptocurrencies. Access to any copy of the original file, however, is not restricted to the owner of the NFT. While copies of these digital items are available for anyone to obtain, NFTs are tracked on a blockchain to provide the owner with a proof of ownership that is separate from a copyright, for example. That is, an NFT is a unit of data stored on the digital ledger (e.g., the blockchain), which can be sold, traded and/or transferred. The NFT can be associated with a particular digital or physical asset (such as a file or a physical object) and a license to use the asset for a specified purpose or for transferring the ownership of the asset from one owner to another. NFTs (and the associated license to use, copy or display the underlying asset or the ownership assignment thereof) can be traded and sold on digital markets. In this way, NFTs function like cryptographic tokens, but, unlike other tokens (e.g., Bitcoin), NFTs are not mutually interchangeable, hence not fungible. Thus, each NFT may represent a different underlying individual asset and thus have a different value. NFTs are created, for example, when blockchains string records of cryptographic hash a set of characters identifying a set of data onto previous records thereby creating a chain of identifiable data blocks. This cryptographic transaction process ensures the authentication of each digital file by providing a digital signature that is used to track NFT ownership. An NFT is a unique digital token, with most using, for example, the above-referenced Ethereum blockchain to digitally record transactions. Again, the NFT is not a cryptocurrency like Bitcoin or Ethereum, because those are fungible (i.e., exchangeable for another Bitcoin or cash). However, NFTs are recorded in the digital ledger in the same way as cryptocurrency, so there is a listing of who owns each one. In this way, blockchains act as a decentralized system for recording and documenting transactions that involve a specific NFT and/or a plurality of NFTs. In essence, as noted previously, a blockchain is a transaction ledger that maintains identical copies across each computer of a member network and the fact that the ledger is distributed across part of the network facilitates the security of blockchain.

As will be appreciated, transacting smart contracts and NFTs carries an associated expense when using Ethereum. "Gas" refers to the computational effort required to execute operations on the blockchain, and any user must pay a gas fee in order to make transactions or executed smart contracts on Ethereum, for example. Further, gas is the term given to the fee that most NFT trading platforms charge. Thus, gas fees are incurred to conduct the transaction or execute a smart contract on their blockchain platform. For example, gas prices in Ethereum are denoted by a unit of gwei, which itself is a denomination of ether (ETH) that is the cryptocurrency of the Ethereum platform. Each gwei is equal to 0.000000001 ETH. For example, instead of designating that the user's gas costs 0.000000001 ether, this translates to a cost of 1 gwei. The valuation is determined by the amount of traffic on the network and the computation power taken to execute a transaction. Gas fees are payments that users have to make to compensate for the computation energy required to process transactions on the Ethereum blockchain. Ethereum implements something called the proof of work algorithm. In this blockchain, validators who use special algorithms (called miners) solve cryptographic problems. Finding a successful solution to this problem enables sets of transactions to be processed and added to the blockchain. Everything on the Ethereum network costs some denomination of gas. Interestingly, one difference with respect to Hyperledger Fabric is that the Fabric platform does not currently have any associated token or cryptocurrency in the system. So, a user currently does not need to have cryptocurrency in order to use this platform and there is no notion of gas. Gas on the Ethereum network is assigned a market price based upon the demand for resources in the network at a particular moment in time. Therefore, the valuation of Ethereum gas depends upon the supply and demand in the network. If there is high demand for transactions, this requires more miners to complete complicated algorithms creating more work and energy consumption; hence increasing the gas fee. If the gas price does not meet the threshold power, it cannot process the transactions. The user may decide the maximum gas amount they want to spend on a transaction and may set a limit on the gas price expended and wait until such price reaches that limit. This ensures that a user has some control over the transaction expenses. For example, if a user is willing to wait then the transaction will get processed when the gas limit set has been reached. The main criteria for gas expenses will depend upon the size of the smart contract for execution on the blockchain as well as the speed at which the user wants that transaction to be completed. One important aspect of the disclosed embodiments herein is the potential for the elimination and/or reduction in gas fees required to perform the transactions enabled by the disclosed embodiments. This is facilitated, for example, by building on top of the private chain, a layer-2-like solution and configuration as discussed further herein below. Interestingly, one difference with respect to Hyperledger Fabric is that the Fabric platform does not currently have any associated token or cryptocurrency in the system. So, a user currently does not need to have cryptocurrency in order to use this platform and there is no notion of gas. In contrast, with Quorum a coin may be used as the network's token.

Turning our attention to FIG. 1, a high-level block diagram is presented of cloud network services architecture 100 comprising a plurality of platforms implemented in accordance with an embodiment of the invention. More particularly, a private cloud environment 102 for implementing a permissioned, i.e., private DLT 108 (e.g., a private blockchain) that is controlled by a single authority, a public cloud environment 106 for executing a permissionless, i.e., public DLT 148 (e.g., a public blockchain), and a hybrid cloud environment 104 for implementing a hybrid DLT 164 that is controlled by a single authority but with a level of oversight by the public DLT 148, for example, such that communications and/or data and other information associated with one or more private DLTs 108 and one or more public DLTs 148 may be exchanged through DLT ledger exchange 142 across the hybrid DLT 164 of the hybrid cloud environment 104. The aforementioned level of oversight is that a user can go on the well-known Etherscan (a block explorer and analytics platform that allows you to access details on any Ethereum blockchain transactions that are pending and view assets held on any public Ethereum wallet address) or Binance scan (BscScan) (allows users to easily lookup, confirm and validate transactions that have taken place on the Binance blockchain) as well as a "current quarter transactions" tab within the application to see documentation of all their buying, selling, receiving, and/or sending of the cryptocurrency for the platform use hereunder. The current quarter transactions is unique to this application because the accounting aspects have been streamlined for cryptocurrency with a modified view to appear more like a foreign banking currency transaction, whereas looking at Etherscan and/or BscScan in their inherent formulations may be difficult to follow for new users. In this way, the private cloud environment 102, the hybrid cloud environment 104, and the public cloud environment 106 may be employed to deliver the blockchain-based paychat platform services to users in accordance with an embodiment. As will be appreciated, the cloud network services architecture 100 may comprise a plurality of servers, access points and databases in the operation and execution of the respective cloud environments. For avoidance of doubt, as used herein, a public blockchain broadly refers to a blockchain that has been implemented as a permissionless blockchain, meaning anyone can read or write to the blockchain. One advantage of such a public blockchain is it allows individuals who do not know each other to trust a shared record of events without the involvement of an intermediary or third party. Conversely, a private blockchain broadly refers to a permissioned blockchain where the blockchain's participants are known and are granted read and write permissions by an authority that governs the use of the private blockchain.

Figure 6:
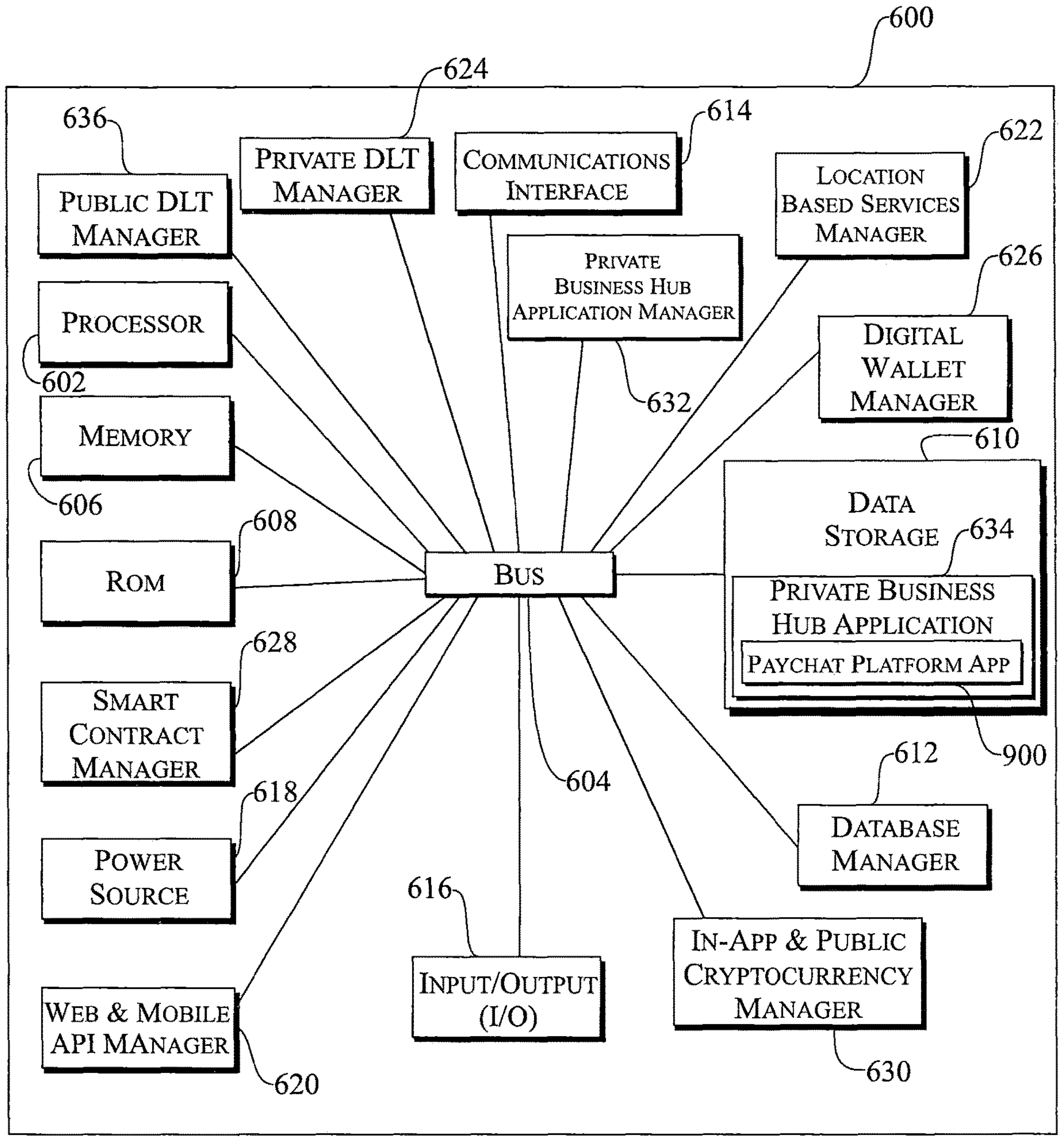
FIG. 6 presents a blockchain-based private business hub system configured in accordance with an embodiment.

Illustratively, in addition to the private DLT 108, the private cloud environment 102 comprises private business hub system 110 (configured in accordance with private business hub system 600 as shown in FIG. 6 and discussed in greater detail herein below) that may employ one or more data and information repositories such as application data 112, private DLT data 114, and proprietary data 116 in the execution of one or more private business hub applications 118. That is, in accordance with the disclosed embodiments, the DLT-based private business hub system 110 delivers a multi-dimensional DLT-based business hub that comprises business and user solutions directed to at least a paychat messenger platform that provides for the exchange of business and personal chats and the monetization of paychats, a facility to send and/or receive payments through quick response (QR) code scanning including, but limited to, invoice creation and storage, an e-commerce platform and a healthcare platform. Illustratively, the private business hub applications 118 comprise at least: an e-commerce application 166, a paychat platform application 120, a gaming alternative dispute resolution (ADR) application 122, a customized escrow application 124, and a supply chain management application 126. As noted, the private DLT 108 in an embodiment is a private/permissioned blockchain(s) (which may also be referred to as a managed blockchain(s)) controlled by a single organization (in this case, for example, the provider and/or administrator of the DLT-based private business hub system 110). In a private blockchain, the central authority determines who can be a node and the central authority also does not necessarily grant each node with equal rights to perform functions. As such, the private DLT 108 has several advantages, including the use of cryptographic approaches known to those of skill in the art for identity management and verification of transactions thereby providing protection against malicious activities intended to compromise a transaction by changing the transaction's details. Moreover, permission controls typically associated with private blockchains can provide dynamic control over who can connect, send, receive, and enact individual transactions, based upon any number of parameters that may not be available or implementable in public blockchains. Accordingly, full control can be asserted over every aspect of a blockchain's operation, not only in accordance with the consensus of its various participants, but the blockchain's administrative intermediary as well.

Private blockchains are only partially decentralized because public access to these blockchains is restricted. Some examples of known private blockchains are the business-to-business virtual currency exchange network Ripple, R3's Corda, Quorum, and Hyperledger, an umbrella project of open-source blockchain applications (as noted herein above). These are permissioned systems which, in the case of Corda and Hyperledger, restrict access to transaction data to the parties involved in that transaction, rather than the data being made public in a public ledger like Bitcoin. Illustratively, the private DLT 108 is a private blockchain architecture designed using Quorum in a preferred embodiment, Hybrid Fabric (in an alternative embodiment) or Hyperledger Besu which is an open-source Ethereum client developed for enterprise applications requiring secure, high-performance transaction processing in a private network as well as the paychat platform app 120 (or any of the other private business applications 118) which is designed, in an embodiment, as a mobile-based app architecture. In addition to supporting the paychat platform as detailed herein, the private DLT 108 will also have other uses including, but not limited to, supporting the supply chain management application 126 in terms of tracking the shipment of goods by both buyers and sellers (e.g., across the e-commerce platform 144), escrow management functionality (e.g., using the customized escrow management application 124), and token transfers across the platform.

As will be appreciated, a mesh network may be employed between various parties for processing personal and business chat sessions hereunder. For example, an illustrative mesh network may employ a peer-to-peer configuration that includes six (6) nodes between a plurality of parties. In this example, node A is associated with the party 1, node B is associated with the party 2, node C is associated with party 3, node D is associated with party 4, node E is associated with party 5, and node F is associated with party 6. This illustrative mesh network is configured such that each node can communicate with and relay data to each of the other nodes. In this way, the various parties may use their respective user devices (e.g., the user device 1 136) to communicate with each other across the mesh network in performing the various operations and/or actions required by the DLT-based private business hub system 110 and associated private business hub applications 118 processing. Of course, this illustrative configuration is only one of many different possibilities that may be utilized to deploy the smart contracts, for example, across the private DLT in accordance with the principles of the disclosed embodiments.

As noted above, in the framework of the principles of the disclosed embodiments, a blockchain is a public ledger of all transactions that have been executed in a particular context (e.g., the paychat messaging platform processing hereunder). The blockchain constantly enlarges as completed blocks are added thereto as new transactions are addressed. Typically, blocks are added to the blockchain in a linear, chronological order by the various user devices involved in the transaction(s) and are interconnected in executing the blockchain protocol, for example, in a peer-to-peer network. The peer-to-peer network is essentially a plurality of interconnected nodes (e.g., node A, node B, node C, node D, node E, and node F) with each node associated with a particular user device the employs a client to validate and relay transactions.

In this way, the blockchain is distributed among multiple devices associated with multiple parties. For example, party A, party B, party C, party D, and party E. In this example, a block 1 is added to the blockchain by party A and may contain the party ID of party A or an address/identification of the user device associated and used by the party A, and may also contain data (e.g., relevant smart contract transaction data). Also, the block 1 may contain an authentication portion that may be used to set restrictions of various levels on the data and/or the party ID. For example, the party ID and the data may be set such that they are not accessible to one or more of the other parties. This may be advantageous if party A, for example, does not want party D to have access to certain of the data. The data may be part of one of the smart contracts employed by the blockchain-based private business hub system 110 and associated operations in applying smart contract transactions processing hereunder. In turn, the smart contract is stored on the blockchain and executed automatically as part of the respective transactions executed: As the user device(s) generate additional blocks, each such block is hashed into the previous blockchain resulting in an updated blockchain which continues to be distributed among the various parties and their respective user devices. The blockchain protocol may include a so-called proof of work scheme that is based on a cryptographic hash function (CHF), for example, the secure hash algorithm 256 (SHA-256). Generally, the CHF receives information as input and provides a hash value output, wherein the hash value has a predetermined length. For example, SHA-256 provides a 256-bit (32-byte, 64 character) hash value output. The blockchain may also require multiple information pieces as input to the CHF. The input, for example, may include a reference to the previous (i.e., most recent) block in the blockchain, details of the transaction(s) that are to be included in the to-be-created block, and a nonce value (e.g., a random number used a single time). Further, the blockchain protocol provides a threshold hash to qualify a block to be added to the blockchain. For example, the threshold hash may include a predefined number of zeros (0's) that the hash value must have at the start, and the higher the number the more effort that is required to arrive at the qualifying hash. Accordingly, similar to party A, parties B, C, D and E may generate additional blocks, respectively, that are hashed into the blockchain which results in a further updated blockchain that is distributed to the respective use devices of the various engaged parties. In accordance with an embodiment, the transactions performed within the private cloud environment 102 and, in particular, the private DLT 108 will be configured as a so-called Layer 2 solution. As will be appreciated, Layer 2 is a term used for solutions created to help scale an application by processing transactions off of the Ethereum Mainnet (i.e., Layer 1) while still maintaining the same security measures and decentralization as the Mainnet. Layer 2 solutions increase throughput (transaction speed) and reduce gas fees, for example. Layer 2 solutions are useful because they allow for scalability and increased throughput while still holding the integrity of the Ethereum blockchain, allowing for complete decentralization, transparency, and security. In an implementation, rollups are employed which are Layer 2 scaling solutions that perform transaction operations off the main Ethereum blockchain, but still post the transaction data onto Layer 1. Considering the transaction data is on Layer 1, rollups are secured by the same Layer 1 security measures. Such Layer 2 roll-ups typically have three (3) main properties: (1) transactions are executed outside of Layer 1 (reduces gas fees); (2) data and proof of transactions reside on Layer 1 (maintains security); and (3) a rollup smart contract which is found on Layer 1, can enforce proper transaction execution on Layer 2, by using the transaction data that is stored on Layer 1. In this way, in accordance with the embodiment, transactions performed within the private cloud environment 102 and, in particular, the private DLT 108 will be aggregated and packaged together such that at some defined interval they will be posted to the public cloud environment 106 and, in particular, the public DLT 148 (e.g., a public blockchain) in accordance with the Layer 2 solution. In a preferred embodiment, the public DLT 148 is provided using a computing services platform administered by Amazon Web Services (AWS), but other such computing services platforms may also be used (e.g., Microsoft Azure, and Google Cloud).

The principles of the disclosed embodiments, as will be further discussed herein, contemplate the definition, administration and use of public cryptocurrencies and/or an in-app cryptocurrency that may be adopted for use with the DLT-based private business hub system 110 and the private business hub applications 118. Further, the DLT-based private business hub system 110 and the private business hub applications 118 may also be configured for use with any type of fiat currency (either in addition to any cryptocurrency or in replacement thereof entirely). In a further aspect, the paychat payments may be made using a designated currency (e.g., designated by the administrator of the DLT-based private business hub system 110 or by the user). In a further aspect, the designated currency may be either a cryptocurrency or a fiat currency (paper currency form, digital currency form, or otherwise, for example, U.S. dollars (USD)). Thus, principles of the disclosed embodiments discussed herein with respect to cryptocurrency, for ease of understanding, will apply equally to configurations employing any type of fiat currency and/or other designated currency as will be readily understood. As will be appreciated, digital currency is a currency form that is available in electronic or digital form, but not in physical form. Digital currencies exist and are only accessible with electronic devices, for example, computers and smartphones. That is, digital currencies are intangible and are owned and transacted by using computers or electronic wallets that have access to specifically designated computer networks. Digital currencies have all the intrinsic properties of physical currency (e.g., banknotes or minted coins) and allow for instantaneous transactions that are seamlessly executed for making payments across borders and geographic boundaries when the parties are interconnected to supported hardware devices and networks. Cryptocurrencies have emerged as the first generation of blockchain technology. Cryptocurrencies are basically digital currencies that are based on cryptographic techniques and peer-to-peer networks. Today, a number of digital currencies variants, regulated or unregulated, exist such as cryptocurrencies and virtual currencies. A cryptocurrency is another form of digital currency that uses cryptography to secure and verify transactions and to manage and control the creation of new currency units. Currently, cryptocurrencies are unregulated so they may also be considered so-called virtual currencies. That is, virtual currencies are an unregulated digital currency that is controlled by its developers, a founding organization, or a defined network protocol. To be clear, the principles of the disclosed embodiments apply equally to any type of digital currency including, but not limited to, any fiat currency, a cryptocurrency, a virtual currency, a central bank digital currency (CBDC), and a digital currency electronic payment (DCEP). In an aspect, currently available public cryptocurrencies may be used including, but not limited to, Bitcoin (BTC), Ethereum (ETH), Binance Coin (BNB), Tether (USDT), Solana (SOL), XRP (XRP), Cardano (ADA), USD Coin (USDC), Binance USD (BUSD), and Avalanche (AVAX). In an embodiment, the business paychat payments may be made in a designated currency. In a further embodiment, the designated currency may be either a cryptocurrency or a fiat currency (paper currency form, digital currency form, or otherwise, for example, U.S. dollars (USD)).

Further, in accordance with the disclosed embodiments, an in-app cryptocurrency may be adopted (e.g., one of the aforementioned public cryptocurrencies discussed herein above) for use with the DLT-based private business hub system 110 and the private business hub applications 118. In various embodiments, the DLT-based private business hub system 110, the private DLT 108 and the private business hub applications 118 allow users to earn, spend and transact in various ways across the private DLT 108 using the cryptocurrencies pursuant to one or more smart contracts, for example, with each user assigned at least one private digital wallet of the plurality of private controlled digital wallets 134. In an aspect, one or more of the private controlled digital wallets 134 is configured as an Ethereum wallet utilizing in-app crypto currency module 128. In this way, in an embodiment, there is the providing, by the DLT-based private business hub system 110 using the private DLT 108, a plurality of digital wallets, wherein each digital wallet of the plurality of wallets being specific to either one of the plurality of users (i.e., the chat target) or one of the plurality of chat initiating parties (i.e., the chat initiator). In this way, the monetization of the different business paychat types use the digital wallets for the exchange of cryptocurrency for the parties to pay and/or receive payments depending upon the specific paychat type and circumstances.

Figure 7:
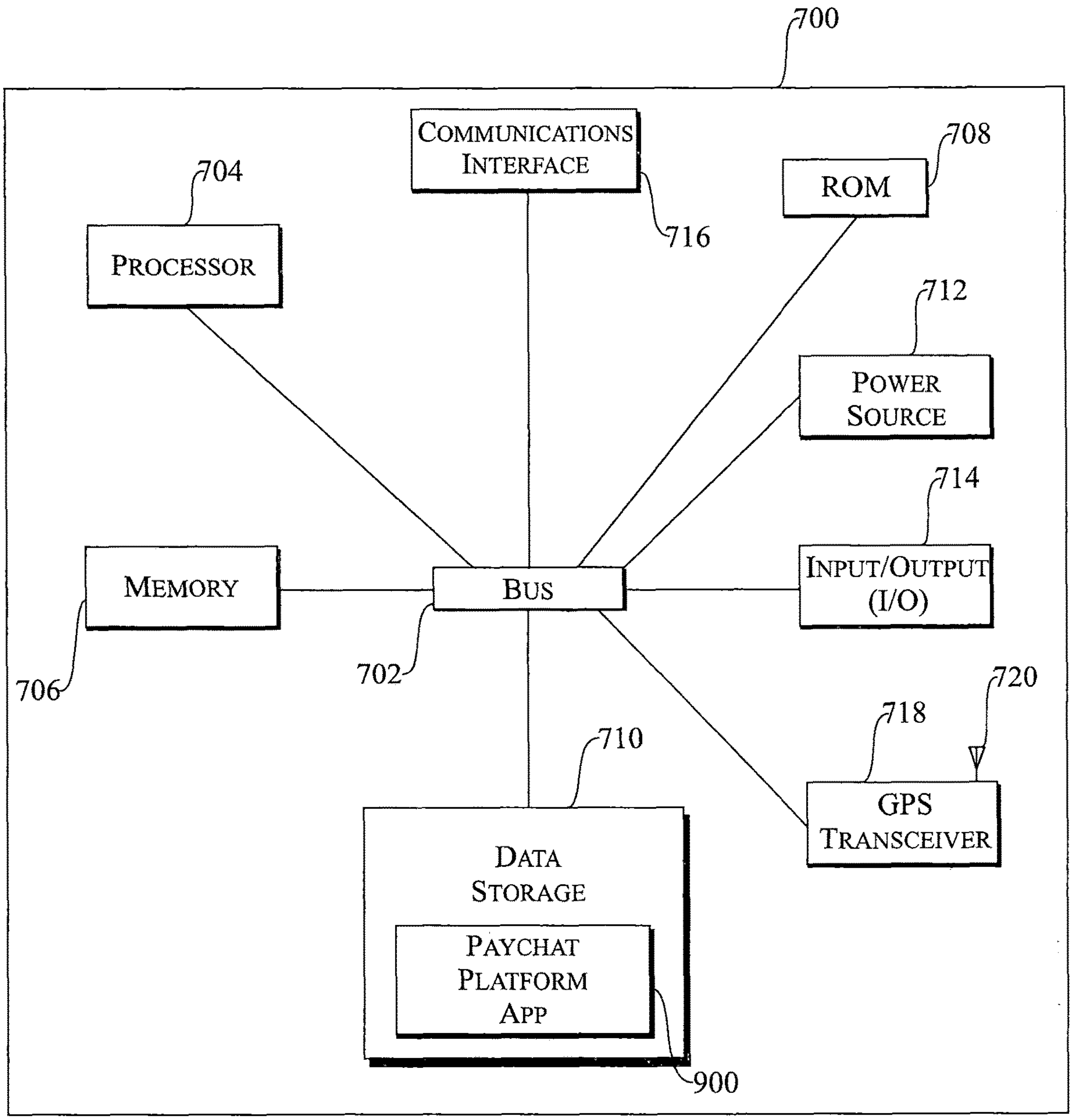
FIG. 7 presents a user device configured in accordance with an embodiment.

In the embodiment shown in FIG. 1, a plurality of users (i.e., user 1 158, user 2 160 through user N 162) engage with the DLT-based private business hub system 110, the private DLT 108 and the private business hub applications 118 deployed on the private cloud environment 102 using a respective user device of a plurality of user device (i.e., user device 1 136, user device 2 138 through user device N 140) where one or more of such user devices are configured in accordance with user device 700 (as shown in FIG. 7), as further detailed herein below. Further, in an embodiment, one or more of the private business hub applications 118 are configured to execute as mobile applications managed by and through mobile application programming interface (API) 130. Communications are facilitated across communications links 156 of the cloud network services architecture 100 in accordance with any number of well-known communications protocols and methods (e.g., wireless communications). This may take the form, for example, of a wide area network connection that communicatively couples the DLT-based private business hub system 110 and/or the user devices 136, 138 and 140 with one or more access points which may be a cellular communications service. Similarly, communications managed may take the form, for example, of a local Wi-Fi network interface or Ethernet interface for communicatively coupling with the well-known Internet.

The public cloud environment 106 comprises the public DLT 148. As will be appreciated, this permissionless network allows anyone to join and is completely decentralized. For example, public blockchains allow all nodes of the blockchain to have equal rights to access the blockchain, create new blocks of data, and validate blocks of data. One popular and mainstream use of public blockchains is for exchanging and mining cryptocurrency. On these public blockchains, the nodes "mine" for cryptocurrency by creating blocks for the transactions requested on the network by solving cryptographic equations. In return for this hard work, the miner nodes earn a small amount of cryptocurrency (e.g., the aforementioned gas fees). The advantageous configuration and design of the public cloud environment 106 and the various elements of the private cloud environment 102 serve to reduce or completely eliminate these mining (e.g., gas) fees. As shown in FIG. 1, the public cloud environment 106 comprises at least the pubic DLT 148, computing services platform 150, public controlled digital wallets 152, and smart contracts 154 (executed across the public DLT 148). Illustratively, the computing services platform 150 provides necessary processing and storage functionality for the public DLT 148 (e.g., a blockchain), and may include a platform such as Amazon Web Services, Microsoft Azure, and Google Cloud computer for implementing the public DLT 148 comprised by the public cloud environment 106.

As noted above, the hybrid cloud environment 104 comprises the DLT ledger exchange 142 for facilitating communications by and between the private DLT 108, the public DLT 148 and the hybrid DLT 164. Further, in accordance with the disclosed embodiments, the hybrid cloud environment 104 further comprises e-commerce platform 144 and business hub exclusive chatroom 146, using the hybrid DLT 164, as enabled by at least the DLT-based private business hub system 110 and the private business hub applications 118 (i.e., the paychat platform application 120 and the e-commerce application 166). In an embodiment, the e-commerce platform 144 and the business hub exclusive chat room are both web-based applications that will interface with web API 132 of the private cloud environment 102.

Figure 9:
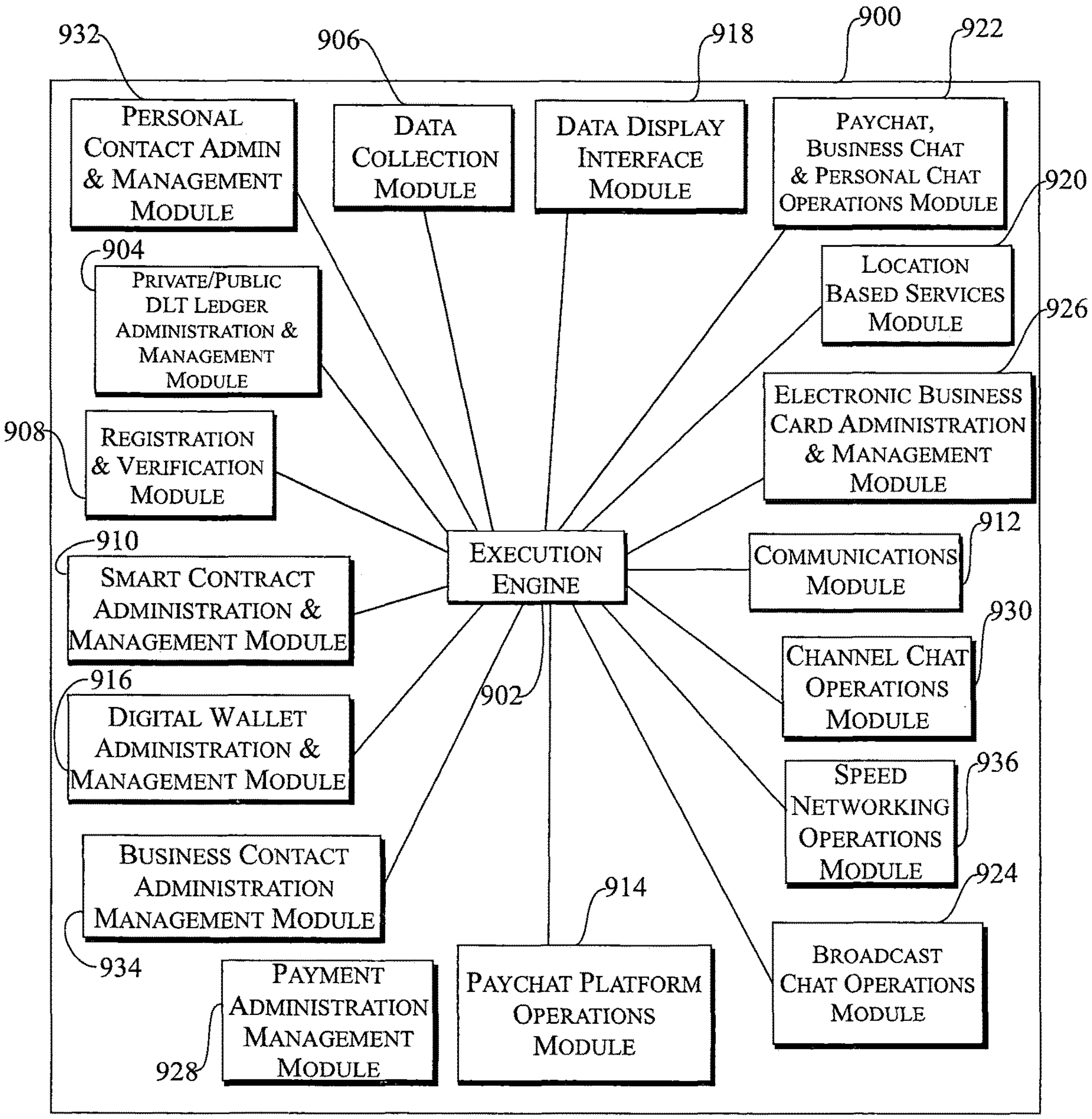
FIG. 9 presents an illustrative architecture for a paychat platform application that is one of the private business hub applications of FIG. 8 in accordance with an embodiment.

Turning our attention to FIG. 2, a flowchart of illustrative operations 200 is shown for implementing a blockchain-based paychat platform and business paychat sessions thereon in accordance with an embodiment. For clarity, the detailed discussion herein will focus on a blockchain-based implementation. However, any DLT-based implementation may be effectively utilized in accordance with principles of the disclosed embodiments herein. As noted above, the private business hub applications 118 provide for a plurality of applications for delivery and execution by the DLT-based private business hub system 110. The paychat platform application 120 is one such exemplary application and an architecture for which is shown in FIG. 9 and will be further detailed herein below. As shown, the illustrative operations 200 in FIG. 2 for business chat execution comprise, at step 202, establishing, by a DLT-based private business hub system (e.g., the DLT-based private business hub system 110, establishing, by a DLT-based private business hub system, a first plurality of electronic business cards, each electronic business card of the first plurality of business cards being specific to a respective one user of a plurality of users and a respective one channel of a plurality of channels, the respective one channel being associated with the respective one user, and wherein each electronic business card of the first plurality of business cards is for use by a plurality of chat initiating parties for engaging in a first paychat session with the respective one user specific thereto on the chat room platform and the first paychat session (i.e., the one-to-many paychat) is viewable by each chat initiating party of the plurality of chat initiating parties whether or not they were the originating chat initiating party of the first paychat session, and wherein each electronic business card of the first plurality of electronic business cards includes information specific to the respective one user associated therewith comprising at least a name and a scannable identification code configured solely for use with a particular one channel of the plurality of channels but is void of any physical address, electronic mail address, and telephone number associated with the respective one user. In an embodiment, each chat initiating party of the plurality of chat initiating parties whether or not they were the originating chat initiating party of the first paychat session will be responsible for a respective business paychat payment based on their chat participation. Thus, in accordance with the embodiment, this first paychat session (the so-called oneto-many paychat, as detailed above) is triggered by the chat initiating party using a specific electronic business card associated with the respective one user for which that first paychat session is intended as the recipient of the first paychat session request. Further, that specific electronic business card for that recipient may be further associated with and specific to a particular channel of a plurality of electronic business cards associated with that respective one user. Importantly, each paychat that occurs between the respective one user and each other party (e.g., the chat initiating parties) will generate a business paychat payment to the respective one user from each chat initiating party that has chosen and agreed to engage in the paychat session (whether a one-to-one and/or one-to-many paychat), as will be further detailed herein below. Thus, these paychat sessions across a channel allow for a respective one user to reach a large number of individuals regarding a specific content and/or domain area (i.e., the channel) and monetizing the paychats (and their access in engaged therein) generated thereby. In an aspect, the paychat payments hereunder may be in a designated currency that is either a cryptocurrency and/or a fiat currency (e.g., U.S. dollars).

Figure 10:
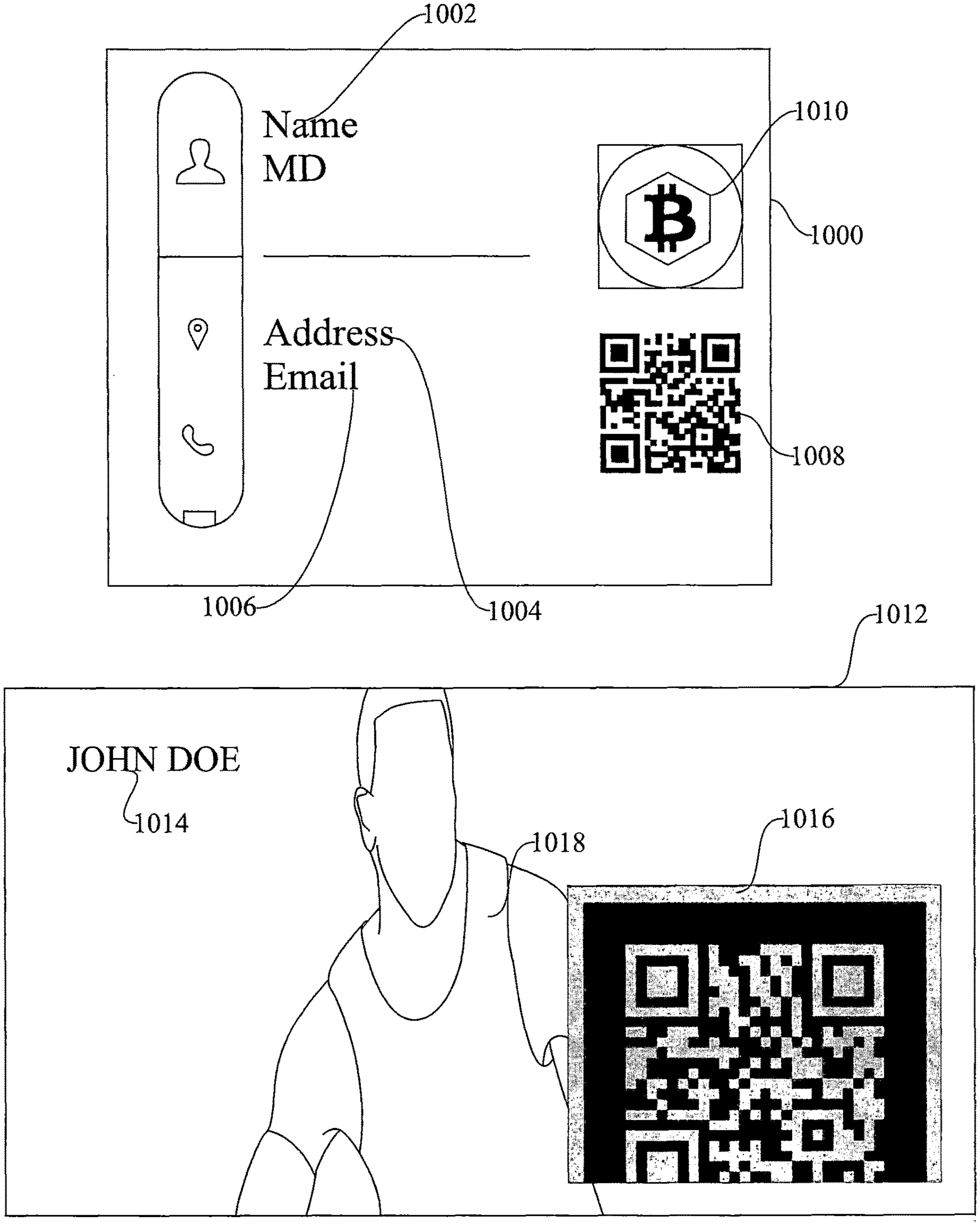
FIG. 10 presents illustrative electronic business cards configured in accordance with an embodiment.

As discussed, each of the two paychat types and the business chat type hereunder employ an electronic business card in the overall chat delivery and operations. So, turning our attention briefly to FIG. 10, illustrative electronic business card 1000 and electronic business card 1012 are shown as configured in accordance with an embodiment. As noted above, these electronic business cards are employed, among other things, to allow for the triggering of a paychat sessions and a business chat session, as the case may be, between the respective user associated with the electronic business card and other parties (e.g., one or more chat initiating parties). In terms of paychat sessions, the electronic business card 1012 comprises a user name (and any other salutations) 1014, a scannable identification code 1016, and a background 1018 (that may be customized by the user with any type of background, image, text, etc.). In an embodiment, the scannable identification code 1016 is a scannable QR code, but it will be understood that other types and forms may be utilized. Further, the scannable identification code 1016 is configured specific to the paychat type (whether the first paychat session type directed to the one-to-many paychat or the second paychat session type directed to the one-to-one paychat). The user may have multiple electronic business cards with each such electronic business card specific to an associated one channel of the user. For example, the user may be a lawyer and have an electronic business card 1012 specific to their law practice domain so that clients may use the electronic business card 1012 to contact them and initiate business paychat sessions to discuss a particular legal matter. In this way, the user may provide their electronic business card 1012 directly to their client thereby providing them with direct access (with no lookup required) in the event the client wants to contact the user. Alternatively, the user may employ a broadcast chat technique by broadcasting one or more their electronic business cards to a plurality of individuals to establish a communication access path to a larger audience. In this way, the user is able to control the messaging and communications flow they receive by using their electronic business cards and business paychat session control/strategy and enabling a direct monetization of their access/time provided to any one particular individual (e.g., a chat initiating party). The scannable identification code 1016 (e.g., a QR-code) may be employed by the chat initiating party (e.g., by the user 1 158 scanning the scannable identification code 1008 employing the user device 1 136) to be added to the associated channel (and the associated business paychat sessions thereof) and to initiate the desired business paychat session with that user across the associated channel. Also, voice and video call features may be initiated by the individual receiving payment in an embodiment and when the other person paying for the paychat is about to pay for the voice or video call they will be prompted that a specific pay rate per minute will be deducted from their digital wallet. They will also receive a prompt if their digital wallet funds become too low for continuing to pay for the service and they will receive a warning (e.g., a one minute warning) that the voice or video call is about to end due to the lack of funds.

In terms of the business chat sessions, the electronic business card 1000 comprises user profile information specific with the user associated therewith including, but not limited to, a name (and any other salutations) 1002, a physical address 1004, an e-mail address 1006, a scannable identification code 1008, and a logo 1010. As noted previously, the business chat sessions are not fee-based. Thus, in accordance with the principles of the disclosed embodiments, any user may establish three (3) sets of electronic business cards directed to triggering a one-to-one business paychat session, a one-to-many paychat sessions across channels and a business paychat session. Importantly, the establishment and use of the electronic business cards for triggering the paychat sessions facilitate the creation of a respective revenue stream to the user by monetizing each such paychat session they engage in with the chat initiating parties.

Turning our attention back to FIG. 2, at step 204, receiving, by the DLT-based private business hub system, from a user device (e.g., the user devices 136 and 138) associated with a particular one chat initiating party (e.g., the user 1 158) of the plurality of chat initiating parties, a request to initiate the first paychat session on the chat room platform with a particular one respective user (e.g., the user 2 160) of the plurality of users using the electronic business card of the first plurality of business cards specific thereof using the electronic business card 1012 specific to the particular one respective one user for the first paychat session type (i.e., the one-to-many paychat). At step 206, initiating, by the DLT-based private business hub system (e.g., the DLT-based private business hub system 110), the first paychat session between the particular one chat initiating party and the particular one respective user on the chat room platform. In an embodiment, there is a prompting, prior to the initiation of the first paychat session, the particular one chat initiating party with a message (e.g., a popup message) comprising a specific charge for the first business paychat payment for the first paychat session, and wherein the first paychat session is initiated only if the particular one chat initiating party agrees to the specific charge in the message for the first business paychat payment. Illustratively, this prompting may be configured as a pop-up message on the user device to which the chat initiating party must respond to in the affirmative if accepting the business paychat payment obligation. Thus, there is receiving, in response to the message, the particular one chat initiating party's acceptance to the specific charge for the first business paychat payment. This ensures that the chat initiating party understands (and accepts) that a payment is required, and the amount charged for the desired business paychat session. In an embodiment, the business paychat session is for a specific time set by the particular one respective user thereby allowing for control of the length of the chat session. Further, in an embodiment, the business paychat payment is determined using a variable rate that may also be adjusted, in real-time, by the particular one user. In this way, the user is able to control the time for the paychat session and/or the rate for monetizing the paychat session. For example, the user may be particularly busy one day and may want to deter the number of paychat session requests they receive and accept. The user may then employ the variable rate mechanism to adjust their paychat session rate up to a larger sum (e.g., from $1.00/chat session to $25,000.00/chat session). Then, at step 208, transferring, by the DLT-based private business hub system using a private DLT, a first business paychat payment from the particular one chat initiating party to the particular one respective user using a cryptocurrency in response to the initiation of the first paychat session. In this way, the respective user is able to monetize their business paychat session(s) and create a potential recurring revenue stream. Further, importantly, this payment is immutable once agreed to and transferred to the user. In an embodiment, there is also the transferring, by the DLT-based private business hub system using the private DLT, the first business paychat payment from each of the other chat initiating parties (i.e., participants but not the originator) of the plurality of chat initiating parties engaging in the first paychat session using the cryptocurrency in response to the initiation of the first paychat session. In accordance with the principles of the disclosed embodiments, the private DLT 108 is employed for the transfer of the business paychat payment is from a one of the private controlled digital wallets 134 associated with the chat initiating party to another one of the private controlled digital wallets 134 associated with the respective one user employing the cryptocurrency of the DLT-based private business hub system 110 and the private DLT 110. In another embodiment, the business paychat payment may employ one or more of the public controlled digital wallets 152 associated with either or both of the chat initiating party and the respective one user such that the cryptocurrency is any available public cryptocurrency including, but not limited to, Bitcoin (BTC), Ethereum (ETH), Binance Coin (BNB), Tether (USDT), Solana (SOL), XRP (XRP), Cardano (ADA), USD Coin (USDC), Binance USD (BUSD), and Avalanche (AVAX). In an embodiment, the business paychat payment hereunder may be made in a designated currency that is either a cryptocurrency and/or a fiat currency (e.g., U.S. dollars). As such, in an embodiment, the business paychat payment transferred is from a first digital wallet associated with the particular one chat initiating party to a second digital wallet associated with the particular one respective user, wherein the first digital wallet is a public digital wallet managed by a public DLT and the second digital wallet is a private digital wallet managed by the private DLT. In this way, the DLT-based private business hub system 110 and the private business hub applications 118, for example, may also be configured for use with any type of designated currency including, but not limited to, a cryptocurrency and a fiat currency (paper currency form, digital currency form, or otherwise, e.g., U.S. dollars (USD); either in addition to any cryptocurrency or in replacement thereof entirely).

In an embodiment the foregoing illustrative operations 200 (and also applied equally to the illustrative operations 300 of FIG. 3) also comprise an optional speed networking feature whereby a user that is part of specific industry (e.g., healthcare) wants to engage with others in that industry on a real-time basis and thereby stimulates networking. In accordance with this feature, each of the user must "opt-in" to be included in the speed networking feature and functionality. In this way, when a user triggers a speed networking request (e.g., the user 1 158 selecting a dedicated speed networking icon on their user device 1 136) the DLT-based private business hub system 110 will automatically establish a communications link between the requesting user and one or more other users of that particular speed networking group. In an embodiment, the communications link established facilitates a video call communication between the linked parties. In this way, a user may select a particular industry they are interested in and be automatically linked with others in that industry.

Turning our attention to FIG. 3, a flowchart of illustrative operations 300 is shown for implementing a blockchain-based paychat platform and paychat sessions that are exclusive between two parties in accordance with an embodiment. This is directed to the second paychat type session (i.e., the one-to-one paychat) hereunder. Again, for clarity, the detailed discussion herein will focus on a blockchain-based implementation. However, any DLT-based implementation may be effectively utilized in accordance with principles of the disclosed embodiments herein. At step 302, establishing, by the DLT-based private business hub system, a second plurality of electronic business cards, each electronic business card of the second plurality of electronic business cards being specific to a respective one user of the plurality of users for use in engaging the respective one user in a second paychat session, wherein each electronic business card of the second plurality of electronic business cards includes information specific to the respective one user associated therewith comprising at least a name and a scannable identification code configured solely for use with the second paychat session but is void of any physical address, electronic mail address, and telephone number associated with the respective one user. At step 304, receiving, by the DLT-based private business hub system, from a user device associated with a particular one chat initiating party of the plurality of chat initiating parties, a request to initiate the second paychat session on the chat room platform with a particular one respective user of the plurality of users using the electronic business card of the second plurality of business cards specific thereto, the second paychat session being exclusive between the particular one respective user and the particular one chat initiating party initiating the second paychat session. Upon initiation, this desired paychat session is a private and exclusive chat session between the chat initiating party and the respective user in contrast to the first paychat session type which is the one-to-many chat vehicle across the respective channels. At step 306, initiating, by the DLT-based private business hub system, the second paychat session between the particular one chat initiating party and the particular one respective user on the chat room platform. In an embodiment, there is a prompting, prior to the initiation of the second paychat session, the particular one chat initiating party with a message comprising a specific charge for the second business paychat payment for the second paychat session, and wherein the second paychat session is initiated only if the particular one chat initiating party agrees to the specific charge in the message for the second business paychat payment. Illustratively, this prompting may be configured as a pop-up screen on the user device to which the chat initiating party must respond to in the affirmative if accepting the required paychat payment obligation. Thus, there is a receiving, in response to the message, the particular one chat initiating party's acceptance to the specific amount for the paychat payment. This ensures that the chat initiating party understands (and accepts) that a payment is required and the amount of that payment for the desired one-to-one paychat session. In an embodiment, the paychat chat session is for a specific time set by the particular one respective user thereby allowing for control of the length of the chat session. Further, in an embodiment, the business paychat payment is determined using a variable rate that may also be adjusted, in real-time, by the particular one user. In this way, the user is able to control the time for the chat session and/or the rate for monetizing the paychat session. For example, the user may be particularly busy one day and may want to deter the number of one-to-one paychat session requests they received and accept. The user may then employ the variable rate mechanism to adjust their chat session rate up to a larger sum (e.g., from $10/chat session to $100/chat session). Then, at step 308, transferring, by the DLT-based private business hub system using the private DLT, a second business paychat payment from the particular one chat initiating party to the particular one respective user using the cryptocurrency in response to the initiation of the second paychat session. Illustratively, the transfer of the paychat payment is from a one of the private controlled digital wallets 134 associated with the chat initiating party to another one of the private controlled digital wallets 134 associated with the respective one user employing the cryptocurrency of the DLT-based private business hub system 110 and the private DLT 110. In another embodiment, the paychat payment may employ one or more of the public controlled digital wallets 152 associated with either or both of the chat initiating party and the respective one user such that the cryptocurrency is any available public cryptocurrency (which may also be adopted as the in-app cryptocurrency) including, but not limited to, Bitcoin (BTC), Ethereum (ETH), Binance Coin (BNB), Tether (USDT), Solana (SOL), XRP (XRP), Cardano (ADA), USD Coin (USDC), Binance USD (BUSD), and Avalanche (AVAX). As such, in an embodiment, the business paychat payment transferred is from a first digital wallet associated with the particular one chat initiating party to a second digital wallet associated with the particular one respective user, wherein the first digital wallet is a public digital wallet managed by a public DLT and the second digital wallet is a private digital wallet managed by the private DLT. In an embodiment, the business paychat payments hereunder may be made in a cryptocurrency and/or a fiat currency (e.g., U.S. dollars).

Figure 4:
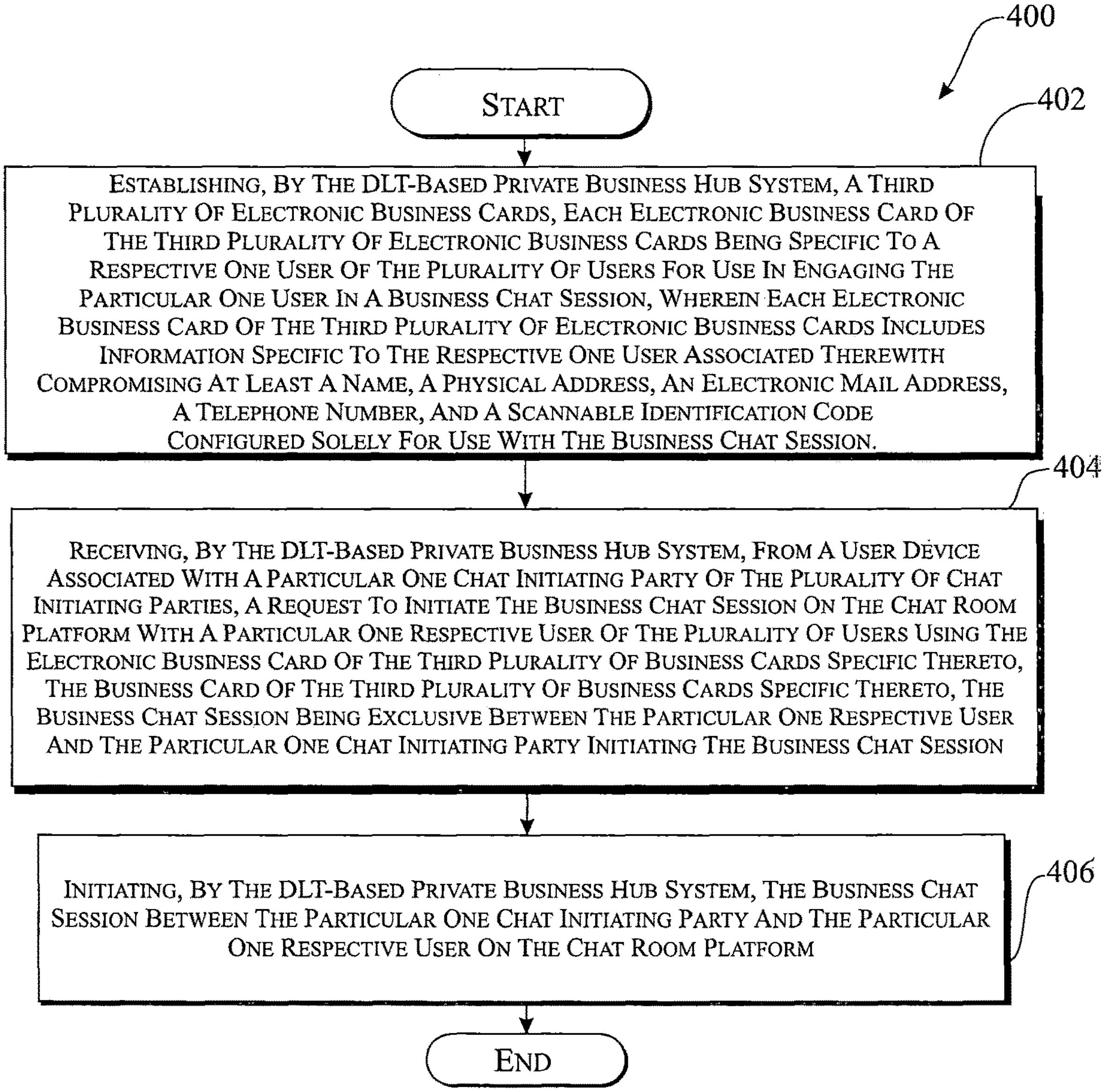
FIG. 4 presents a flowchart of illustrative operations for implementing a blockchain-based paychat platform and business chat sessions in accordance with an embodiment.

Turning our attention to FIG. 4, a flowchart of illustrative operations 400 is shown for implementing a blockchain-based paychat platform and business chat sessions in accordance with an embodiment. More particularly, at step 402, establishing, by the DLT-based private business hub system, a third plurality of electronic business cards, each electronic business card of the third plurality of electronic business cards being specific to a respective one user of the plurality of users for use in engaging the particular one user in a business chat session, wherein each electronic business card of the third plurality of electronic business cards includes information specific to the respective one user associated therewith comprising at least a name, a physical address, an electronic mail address, a telephone number, and a scannable identification code configured solely for use with the business chat session. At step 404, receiving, by the DLT-based private business hub system, from a user device associated with a particular one chat initiating party of the plurality of chat initiating parties, a request to initiate the business chat session on the chat room platform with a particular one respective user of the plurality of users using the electronic business card of the third plurality of business cards specific thereto, the business chat session being exclusive between the particular one respective user and the particular one chat initiating party initiating the business chat session. At step 406, initiating, by the DLT-based private business hub system, the business chat session between the particular one chat initiating party and the particular one respective user on the chat room platform. In contrast with the first and second paychat sessions, the subject business chat session is a "no fee" based chat and as noted above, offers less separation between the user and the chat initiating party but more separation than a personal chat session thereby facilitating, for example, information sharing with each other and supporting business networking.

With respect to such a personal chat session, when an individual adds a user to the chat platform, they may be adding a friend, the referral will be part of the individual's income stream as the referred user is so-called downline, but because the referred user is their friend, they will be in their personal chat, not business chat repository. The blockchain is used to create the genealogy before the chat is ever initiated. The blockchain is not used in non-paychats unless an individual wants to send money across the text message randomly. In contrast, when the individual uses the paychat, the private blockchain is always used, because there is always a moving payment function per each paychat on the client side to pay the administrator of the paychat platform. One may view this functionality as a collage, where the creator of the collage does not have to pay to write on the collage, but everyone else must pay to post a message on the collage (e.g., the channel paychat) or if the collage is limited to two (2) people (e.g., the administrator and client) then the one invited is only paying to post on the collage.

Figure 11:
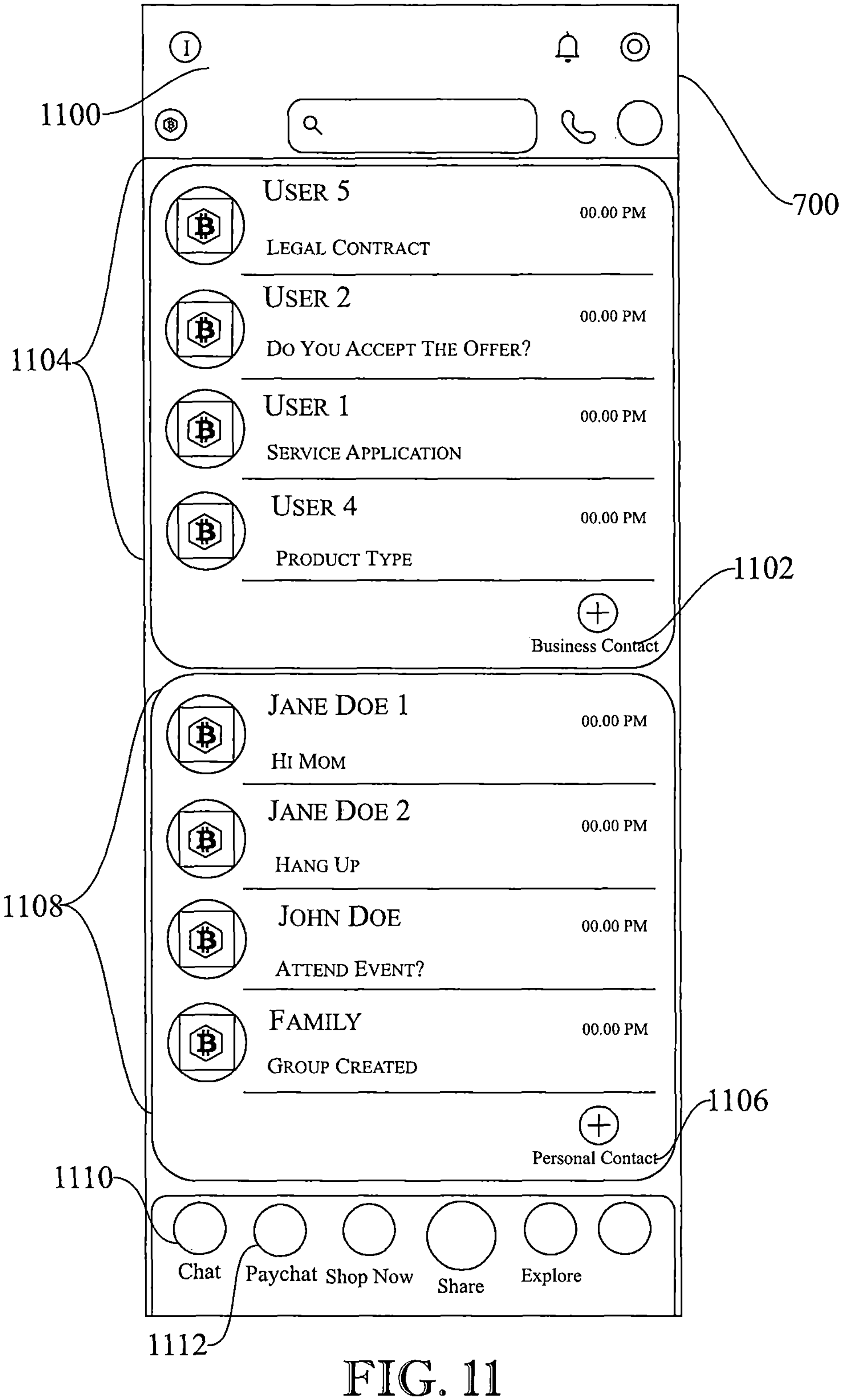
FIG. 11 presents an illustrative user device interface for business contacts and personal contacts listings useful for paychats in accordance with an embodiment.
Figure 12:
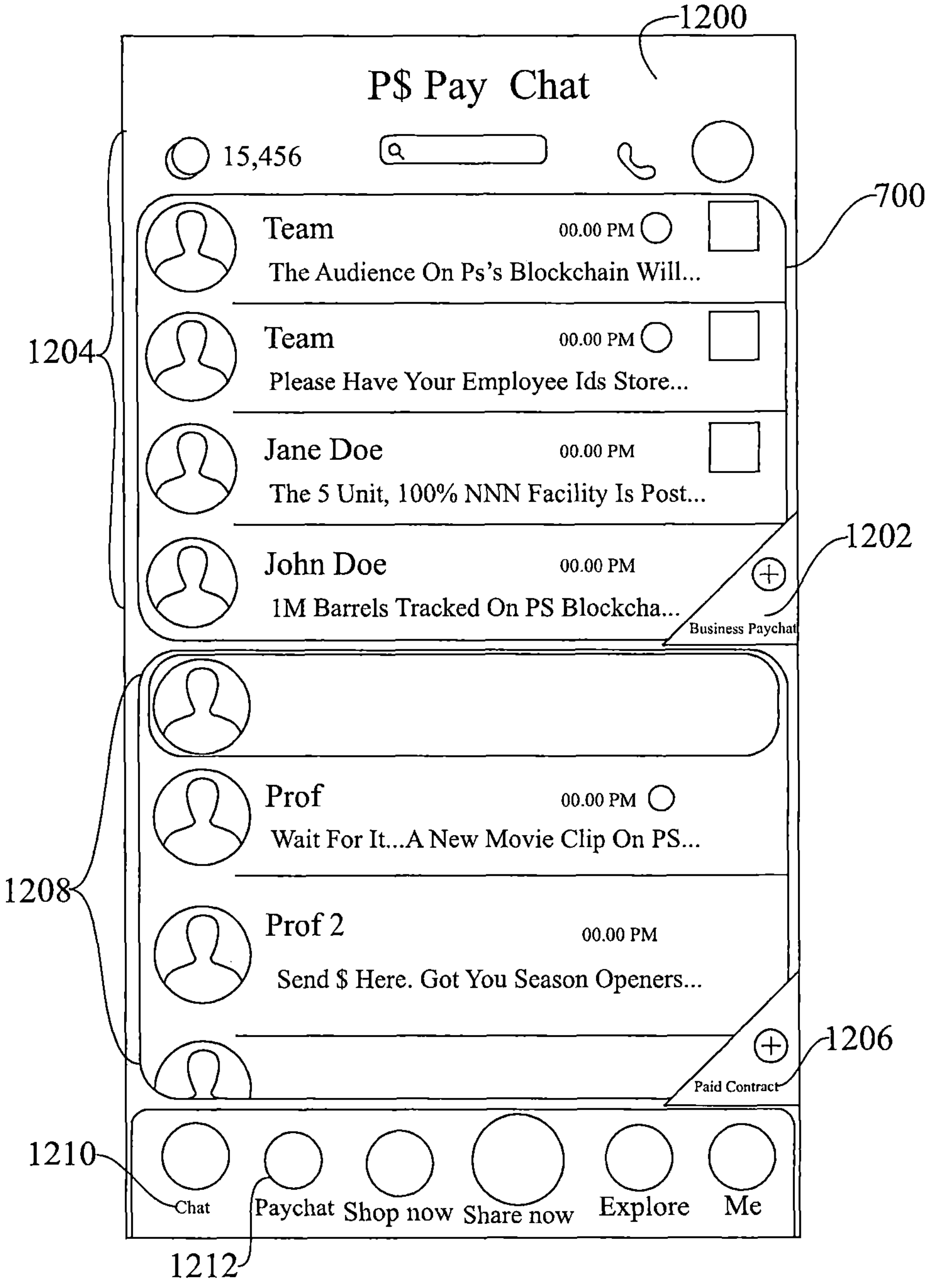
FIG. 12 presents an illustrative user device interface for individual paychat sessions in accordance with an embodiment.

To further illustrate and detail the aforementioned operational aspects of the disclosed embodiments and the understanding thereof, we now turn our attention to FIGS. 11, 12, 13 and 14 that depict a series of illustrative user device interfaces resulting from the chat platform services and operations in accordance with an embodiment. In particular, FIG. 11 presents an illustrative user device interface 1100 displayed on a user device (e.g., user device 1 158 configured in accordance with user device 700 as shown in FIG. 7) for business contacts listing 1102 and personal contacts listing 1106 in accordance with an embodiment. As shown, the business contacts listing 1102 comprises a plurality of business contacts 1104, and the personal contacts listing 1106 comprises a plurality of personal contacts 1108. A chat session, whether a paychat session, business chat session, or a personal chat session, may be initiated by the user employing the chat 1110 icon (for personal and business chat sessions) and paychat icon 1112 (for paychat sessions; one-to-one paychats and one-to-many paychats) available for selection by the user using the illustrative user device interface 1100 as displayed on a user device 700. FIG. 12 presents an illustrative user device interface 1200 for individual paychat sessions displayed on the user device 700 in accordance with an embodiment. In particular, paychat 1202 comprises a plurality of business session paychats 1204 where individuals (e.g., chat initiating parties) are paying you (i.e., the user) to chat/speak with. Paid contacts 1206 comprises a plurality of paid contacts 1208 that you (i.e., the user) are going to chat/speak with (and receiving payment therefore) and chat sessions for which you are paying. The chat icon interface is divided into two (2) selections one for chat 1210 (i.e., personal and business chat sessions) and the other for paychat 1212 (i.e., for paychat sessions; one-to-one paychats and one-to-many paychats).

Figure 13:
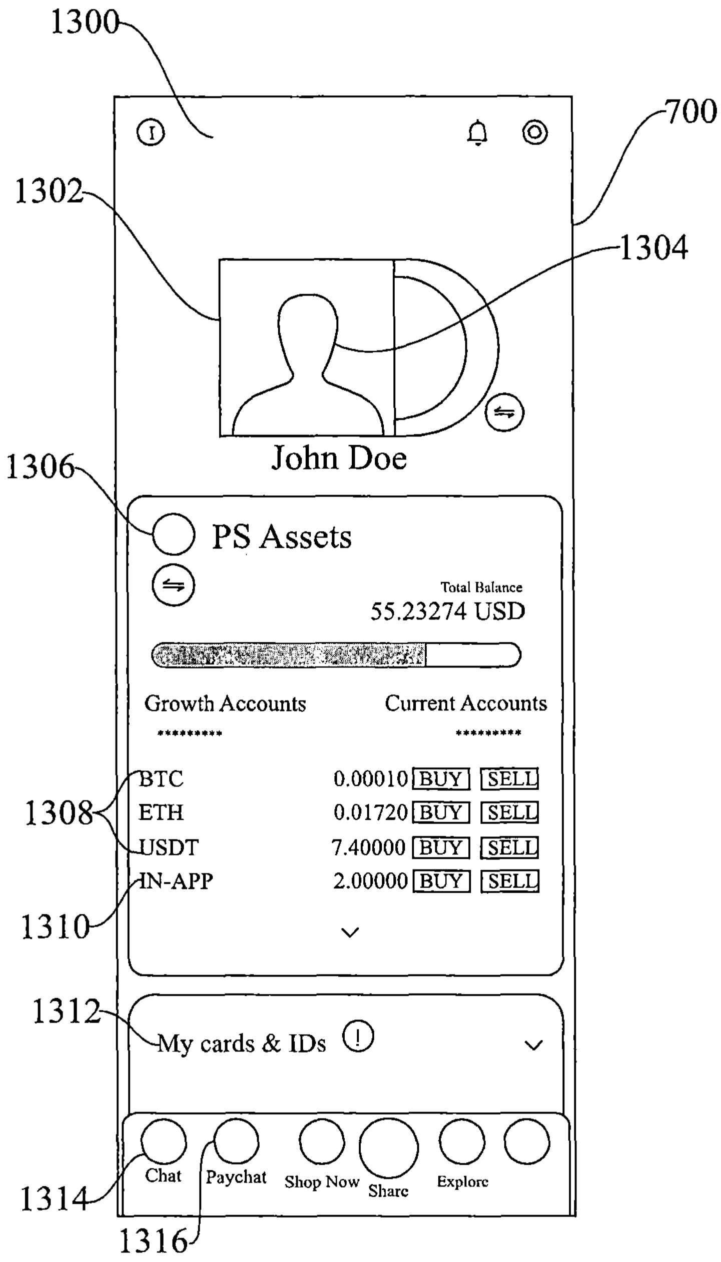
FIG. 13 presents an illustrative user device interface showing cryptocurrencies for use the private business hub applications including, but not limited to, the paychat platform application in accordance with an embodiment.
Figure 14:
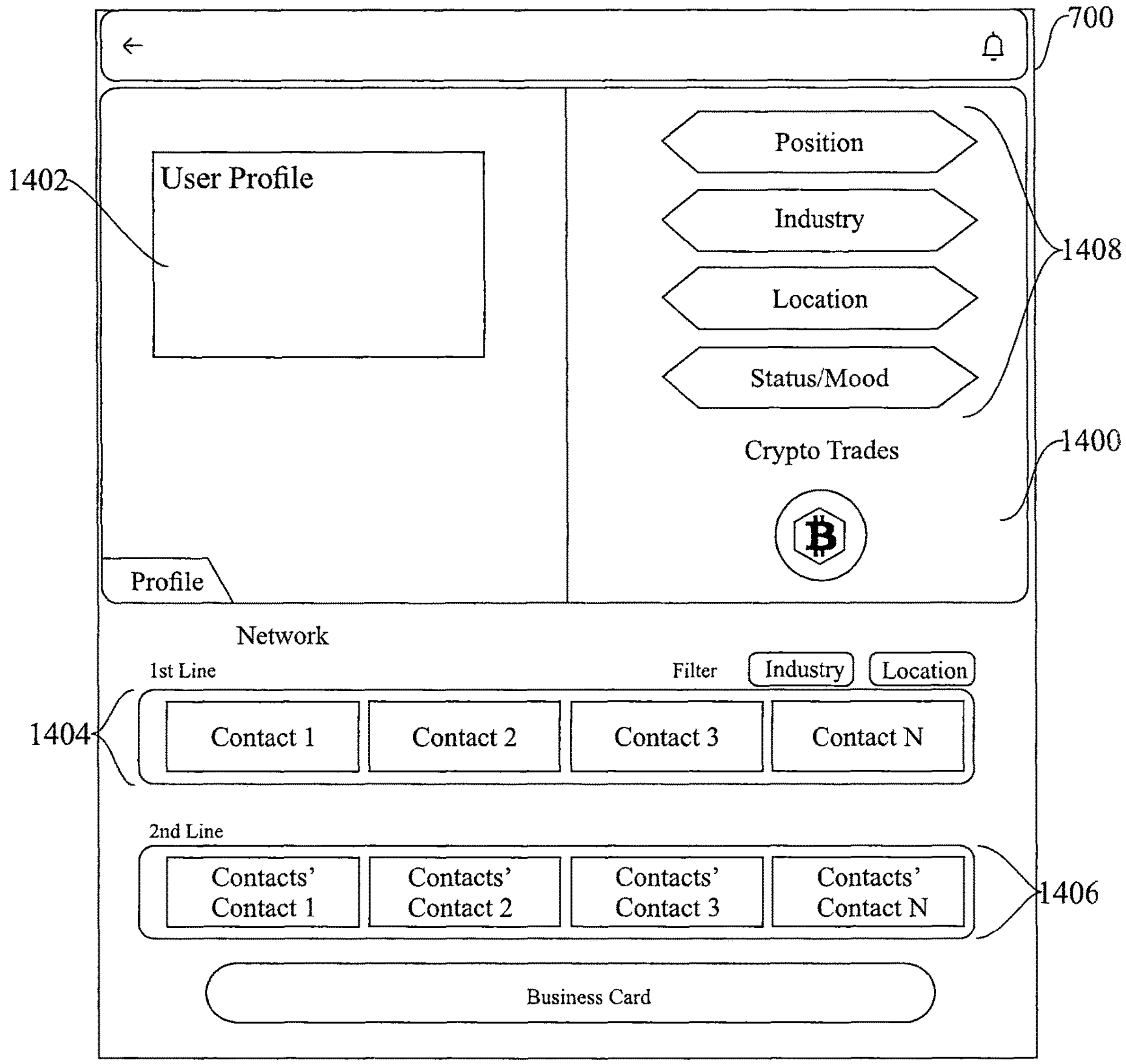
FIG. 14 presents an illustrative user device interface showing a user profile and associated contact networks useful for paychats in accordance with an embodiment.

FIG. 13 presents an illustrative user device interface 1300 displayed on the user device 700 showing cryptocurrencies for use in accordance with an embodiment. As shown, a user profile 1302 is displayed which may also comprise a photograph 1304 of the associated user. Cryptocurrency assets 1306 shows a compilation of the associated user's cryptocurrency assets for use, for example, in paying for the business paychat sessions, as detailed herein above. Illustrative user device interface 1300 allows provides for the buying and/or selling of a plurality of public cryptocurrencies 1308 and/or the in-app cryptocurrency 1310 adopted for use with the DLT-based private business hub system 110 and the private DLT 108. Electronic cards and ID 1312 section provides for the storage and access by one or more electronic business cards as used for paychats and business chats, credit cards, and/or forms of identification. A chat session, whether a business paychat session, business chat session, or a personal chat session, may be initiated by the chat 1314 icon (for personal chat and business chat sessions) and paychat icon 1316 (for paychat sessions; one-to-one paychats and one-to-many paychats) available for selection by the user. Further, FIG. 14 presents an illustrative user device interface 1400 displayed on the user device 700 showing a user profile 1402 and a plurality of personal information/traits 1408. Various contact networks are shown such as a plurality of user contacts 1404 that are individual contacts of that user and a plurality of user contacts' contacts 1406 thereby expanding the available contact base for paychat sessions.

Figure 5:
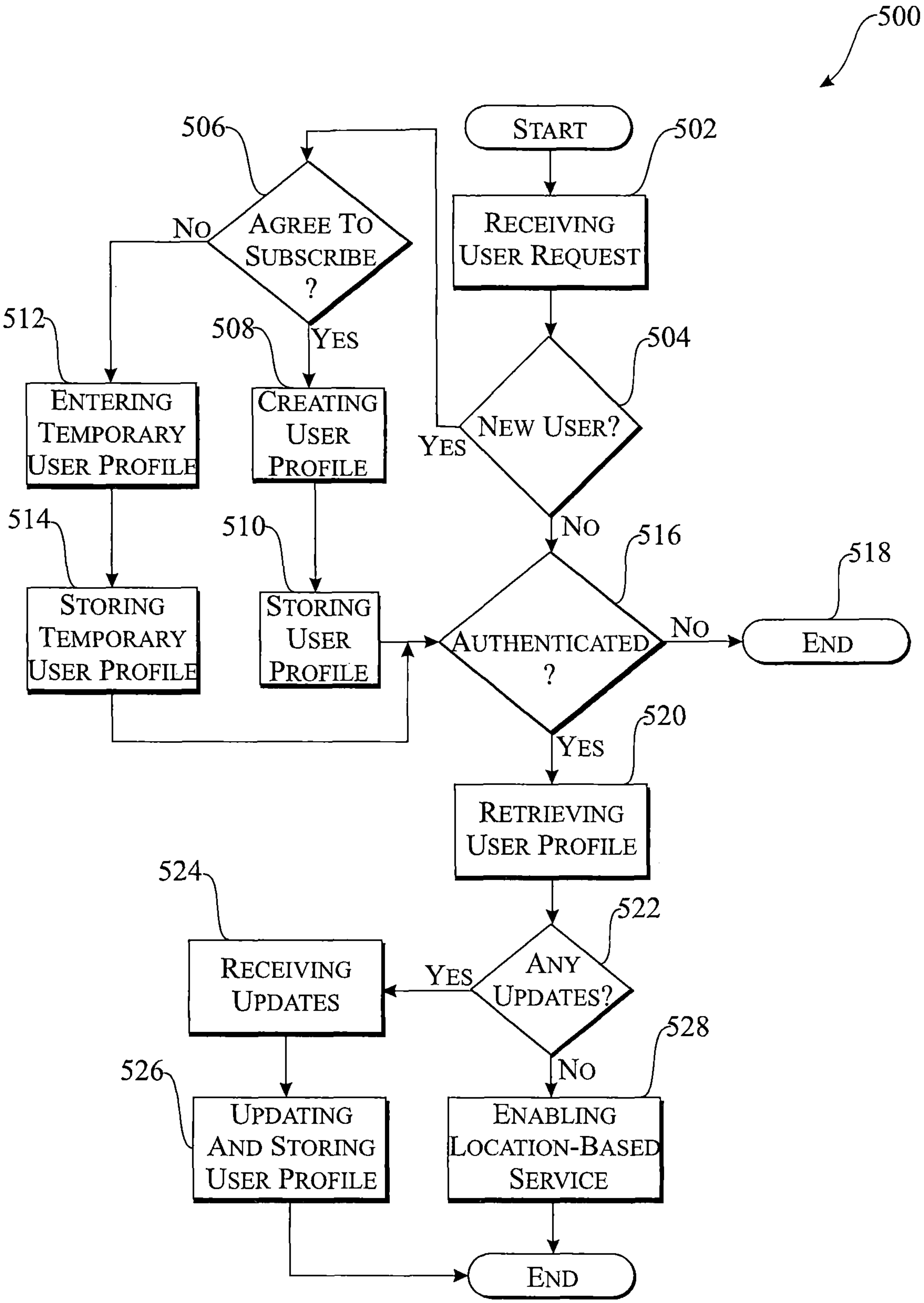
FIG. 5 presents a flowchart of illustrative operations for user onboarding and subscription in accordance with an embodiment.

Turning our attention back to FIG. 5, a flowchart of illustrative operations 500 is shown for user onboarding and subscription in accordance with an embodiment. As noted above, the disclosed embodiments herein contemplate a subscription-based service for use by the users but may also be used in a non-subscribed platform. As such, at step 502, receiving a user request (e.g., the user 1 158). At step 504, determining if a user is a new or returning user and, if a new user, then at step 506 determining whether the user is agreeable to becoming a subscriber or not (e.g., in accordance with a user agreement and/or user privacy/security agreement). If so, then the new user is subscribed and, at step 508, a user profile is created and the user profile is stored, at step 510. Illustratively, the user profile may be configured such as the user profile (e.g., the user profile 1302 as shown in FIG. 13) and may comprise, among other information, at least the user's name, a user ID, notes and instructions, general account information (e.g., digital wallets and/or financial account passwords), multimedia content and other associated information that may facilitate the chat sessions hereunder. If the user declines to become a subscriber, then they may proceed as a non-subscriber and will be entering, at step 512, a temporary user profile and storing the user profile at step 514. Illustratively, such temporary user profile may be an abbreviated version of the aforementioned user profile 1302. If the user is a returning user (or one of the newly subscribed users or new non-subscribed user), their identity is authenticated, at step 516 (e.g., using the aforementioned user ID). In an embodiment, two-factor authentication is used to verify the user's credentials (e.g., a text message to the user device 700 associated with this user or other third-party verification mechanisms). If not authenticated, then the operations end at step 518, and if they are authenticated then, at step 520, their respective stored user profile is retrieved. A determination is made, at step 522, as to whether any updates to the user profile are desired and if so, then at step 524, receiving the update, and updating and storing the user profile, at step 526. If no updates are necessary (or after the updating operations are completed), at step 528, then enabling location-based services to allow for identifying a real-time location of the user which may be useful information in deploying the various chat and other features of the disclosed embodiments that may utilize such current location status information and proximity locations.

Turning our attention to FIG. 6, a blockchain-based private business hub system 600 is configured in accordance with an embodiment. Illustratively, as noted previously, the DLT-based private business hub system 110 is configured in accordance with the FIG. 6 architecture for the blockchain-based private business hub system 600. As shown, the blockchain-based private business hub system 600 comprises processor 602 for executing program code (e.g., any one of the private business hub applications 118 and the paychat platform app 900 shown in FIG. 9 which shares the same architecture with the paychat platform app 120 of FIG. 1) and communications interface 614 for managing communications to and from the blockchain-based private business hub system 600, memory 606 and/or read-only memory (ROM) 608 for storing program code and data, and power source 618 for powering the blockchain-based private business hub system 600. The memory 606 is coupled to the bus 604 for storing computer-readable instructions to be executed by the processor 602 including, but not limited to, private business hub application 634 (e.g., execution of the paychat platform app 900). Database manager 612 is used to manage the delivery and storage of content, data, and other information in any well-known database(s) types (including but not limited to, the application data 112, private DLT data 114, and proprietary data 116) and across third-party content providers, for example. As detailed herein, the operations performed by for the blockchain-based private business hub system 600 in combination with the paychat platform app 900, for example, provide for the delivery of the blockchain-based paychat platform that facilitates the exchange and monetization of business paychat sessions.

Web and mobile API manager 620 is used to deliver and manage content, data, and other information across one or more web-based applications (e.g., the web API 132, the e-commerce platform 144 and business hub exclusive chat room 146) and mobile-based applications (e.g., the mobile API 130 and the paychat platform application 120), as the case may, that may be utilized to access and use the blockchain-based private business hub system 600, for example. Further, the operations provided by and through the paychat platform app 900 may be offered, in whole or in part, through a web-based application in addition to the mobile-based application. As will be discussed in greater detail herein below, the paychat platform app 900, as stored in data storage 610, when executed by the processor 602 will enable access by a plurality of parties (e.g., the user 1 158, user 2 160 through user N 162) to the blockchain-based private business hub system 600 for the processing of, for example, the execution of the various chat sessions described herein. Such processing is further enabled by private DLT manager 624, public DLT manager 636, digital wallet manager 626, smart contract manager 628, in-app and public cryptocurrency manager 630, and private business hub application manager 632.

Location-based services manager 622 facilitates the delivery of location-based services (e.g., GPS tracking) either independently or on a user device (e.g., the user device 2 138) thereby allowing the blockchain-based private business hub system 600 to register the exact location of the user of the user device, for example, as the user roams from one location to another location such that the services offered via the blockchain-based paychat messaging platform and processing hereunder may be tailored to a current location and/or the needs of the user may change based on their current location and a particular chat session encounter. In an embodiment, the blockchain-based paychat platform processing provided through the execution of the paychat platform app 900 may also include a web-based delivery platform and/or accessing and interfacing any number of websites using the web and mobile API manager 620 for procuring information and data that can be used in the blockchain-based private business hub system 600. The term "website" in the context herein is used in a conventional and broadest sense and is located on at least one server containing web pages stored thereon and is operational in a 24-hour/7-day typical fashion. The DLT-based private business hub system 600 may also include one or more input/output devices 616 that enable user interaction with the various user devices (e.g., camera, display, keyboard, mouse, speakers, microphone, buttons, etc.). The input/output devices may include peripherals, such as an NFC device (e.g., NFC tag reader), camera, printer, scanner (e.g., QR-code scanner), touchscreen display, etc. For example, the input/output devices 616 may include a display device such as a cathode ray tube (CRT), plasma monitor, liquid crystal display (LCD) monitor or organic light-emitting diode (OLED) monitor for displaying information to the user, a keyboard, and a pointing device such as a mouse or a trackball by which the user can provide input to the user device or an associated display device, for example.

The communications interface 614 is used to facilitate communications across the communications links 156 (see, FIG. 1) within the cloud network services architecture 100. This may take the form, for example, of a wide area network connection that communicatively couples the blockchain-based private business hub system 600 with one or more access points which may include a cellular communications service. Similarly, communications managed by the communications interface 614 may take the form, for example, of a local Wi-Fi network interface or Ethernet interface the communicatively couples the blockchain-based private business hub system 600 with the well-known Internet, and ultimately to any user device. In the instant embodiment, the paychat platform app 900 and/or the communications interface 614 may include a communications stack for facilitating communications over the respective communications link 156. Electronic communications by and through blockchain-based private business hub system 600 between the various systems, networks, devices, users, entities, and/or individuals are facilitated by the communications links 156 in accordance with any number of well-known communications protocols and methods (e.g., wireless communications).

Turning our attention to FIG. 7, an illustrative user device 700 is shown for use with the blockchain-based private business hub system 600, for example, in accordance with an embodiment. The user device 700 (e.g., the user device 1 136, as configured) typically includes bus 702 and processor 704 coupled to the bus 702 for executing operations and processing information. As will be appreciated, a "user device" in the context herein may comprise a wide variety of devices such as any type of hardware device, user devices, smartphones, laptop computers, desktop computers, tablets, and wearable devices, to name just a few, that execute applications (e.g., a mobile application) in accordance with the principles of the disclosed embodiments herein. For example, the execution of the paychat platform app 900 as detailed herein. The processor 704, as powered by power source 712, may include both general and special purpose microprocessors, and may be the sole processor or one of multiple processors of the device. This is equally applicable to the processor 602 of FIG. 6. Further, the processor 704 (or the processor 602) may comprise one or more central processing units (CPUs) and may include, be supplemented by, or incorporated in, one or more application-specific integrated circuits (ASICs) and/or one or more field programmable gate arrays (FPGAs).

The user device 700 may also include memory 706 coupled to the bus 702 for storing computer-readable instructions to be executed by the processor 704. The memory 706 may also be utilized for storing temporary variables or other intermediate information during the execution of the instructions by the processor 704. The user device 700 may also be ROM 708 or other static storage device coupled to the bus 702. Further, data storage device 710, such as a magnetic, optical, or solid-state device may be coupled to the bus 702 for storing information and instructions for the processor 704 including, but not limited to, the paychat platform app 900. Data storage device 710 (or the data storage device 610) and the memory 706 (and the memory 606) may each comprise a non-transitory computer readable storage medium and may each include high-speed random access memory, such as dynamic random access memory (DRAM), static random access memory (SRAM), double data rate synchronous dynamic random access memory (DDR RAM), or other random access solid state memory devices, and may include non-volatile memory, such as one or more magnetic disk storage devices such as internal hard disks and removable disks, magneto-optical disk storage devices, optical disk storage devices, flash memory devices, semiconductor memory devices, such as erasable programmable read-only memory (EPROM), electrically erasable programmable read-only memory (EEPROM), compact disc read-only memory (CD-ROM), digital versatile disc read-only memory (DVD-ROM) disks, or other non-volatile solid state storage devices.

The user device 700 may also include one or more communications interface 716 for communicating with other devices via a network (e.g., a wireless communications network) or communications protocol (e.g., Bluetooth®). For example, such communication interfaces may be a receiver, transceiver, or modem for exchanging wired or wireless communications in any number of well-known fashions. For example, the communications interface 716 (or the communications interface 614) may be an integrated services digital network (ISDN) card or modem/router used to facilitate data communications of various well-known types and formats. Further, illustratively, the communications interface 716 (or the communications interface 614) may be a local area network (LAN) card used to provide data communication connectivity to a comparable LAN. Wireless communication links may also be implemented. The Global Positioning System (GPS) transceiver 718 and antenna 720 facilitate delivery of location-based services in order to register the exact location of the user device 700, for example, as the user roams from one location to another location. As will be understood, the application herein will be able to track individual users upon the launching of the application thereby enabling the well understood GPS location features of the user device 700 (e.g., a smartphone).

As will be appreciated, the functionality of the communication interface 716 (or the communications interface 614) is to send and receive a variety of signals (e.g., electrical, optical, or other signals) that transmit data streams representing various data types. The user device 700 may also include one or more input/output devices 714 that enable user interaction with the user device 700 such as a camera, display, keyboard, mouse, speakers, microphone, buttons, etc. The input/output devices 714 (or I/O devices 616) may include peripherals, such as an NFC device (e.g., NFC reader), camera, printer, scanner (e.g., QR-code scanner for scanning the scannable identification code 1008), touch-screen display, etc. For example, the input/output devices 714 (or the I/O devices 616) may include a display device such as a cathode ray tube (CRT), plasma monitor, liquid crystal display (LCD) monitor or organic light-emitting diode (OLED) monitor for displaying information to the user, a keyboard, and a pointing device such as a mouse or a trackball by which the user can provide input to the user device 700 or an associated display device, for example.

As noted above, the DLT-based private business hub system 110 delivers a multi-dimensional DLT-based business hub and platform that comprises business and user solutions directed to at least a paychat messenger platform that provides for the exchange of business and personal chats and the monetization thereof, a facility to send and/or receive payments through quick response (QR) code scanning, supply chain and vendor management including, but limited to, invoice creation and storage, an e-commerce platform and a healthcare platform. As noted previously, the private business hub applications 118 include, but are not limited to, the e-commerce application 166, the paychat platform application 120, the gaming alternative dispute resolution (ADR) application 122, the customized escrow application 124, and the supply chain management application 126. The multi-dimensional DLT-based business hub and platform delivered is directed to business transactions and a business hub with a focus on e-commerce and cryptocurrency industries. The solutions provided address business problems directed to third-party intervention in real-life operations when automation, security and/or speed is involved, data security in the digital era, business location and cross-border constraints, currency fluctuations in national currencies, disparities in size between mega-corporations and smaller-sized corporations, lowering barrier of entries for under-resourced populations, and lack of efficiency and technological innovations in certain industrial sectors (e.g., healthcare). The multi-dimensional DLT-based business hub and platform is configured for bridging the commercial sales platform gap by facilitating a branding solution for traditional "brick and mortar" businesses while also bridging the gap between buyers and sellers in various business segments such as production, retail and sales through a mobile platform-based business hub that is gamified (in part), enjoyable to use, and more efficient. Further, the multi-dimensional DLT-based business hub and platform provides for product monitoring, managing supplies, and business and database centralization, eliminates (or substantially reduces) the business costs associated with tracking and managing inventory, substantial reduction in "middle-man" operations and/or third-party escrow, increased marketplace transparency, improved security in terms of at least trade and payment, and reduced complexity in user operations/engagement.

Figure 8:
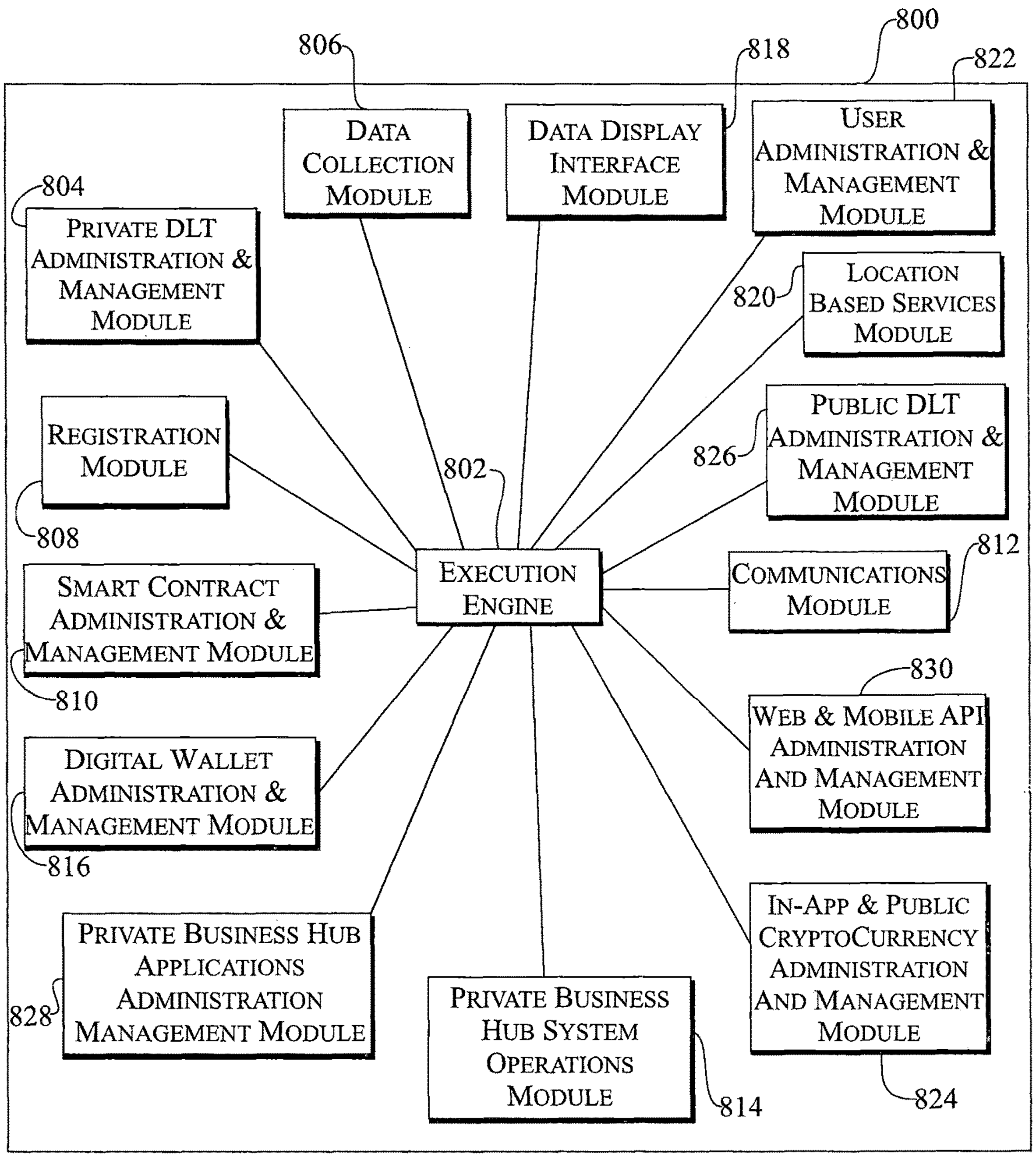
FIG. 8 presents an illustrative architecture for a DLT-based private business hub system application for delivering and executing private business hub applications in accordance with an embodiment.

In this way, turning our attention to FIG. 8, an illustrative architecture for a DLT-based private business hub system application 800 for delivering and executing the aforementioned private business hub applications and associated operations and services in accordance with an embodiment. As will be appreciated, the architecture may be used, illustratively, in conjunction with the cloud network services architecture 100, the DLT-based private business hub system 110, and/or the user device 700 for launching and executing one or more the private business hub applications 118 and its associated operations. As shown, the architecture for the operations of the DLT-based private business hub system application 800 provides several interfaces and engines used to perform a variety of functions such as the collection, aggregation, manipulation, processing, analyzing, verification, authentication, and display of applicable real-time information and data that are useful to realize the delivery of the multi-dimensional DLT-based business hub that comprises business and user solutions pursuant to the disclosed embodiments including, but not limited to, the paychat platform services detailed herein. More particularly, data display interface module 818 and communications module 812 are used to facilitate the input/output and display of electronic data and other information to, illustratively, the users (e.g., the user 2 160) employing the user device 2 138 (e.g., a touch screen of the user device 700) for engaging with one or more of the private business hub applications 118 and the execution thereof. The data collection module 806 facilitates data gathering from a plurality of users and other third parties. The location-based services module 820 provides for the delivery of location-based services in order for the geographic locations of the users to be identified and displayed (e.g., GPS locations) in accordance with any location and proximity-based features of the private business hub applications 118. The communications module 812 will also facilitate communications by and through the DLT-based private business hub system 110, for example.

Execution engine 802 may be employed to deliver the operations pursuant to the execution of the private business hub applications 118. In such delivery, the execution engine 802 will operate and execute, as further detailed herein below, with at least the following program modules: private DLT administration and management module 804, data collection module 806, registration module 808, smart contract administration and management module 810, communications module 812, private business hub system operations module 814, digital wallet administration and management module 816, data display interface module 818, user administration and management module 822, in-app and public cryptocurrency administration and management module 824, public DLT administration and administration module 826, private business hub applications administration and management module 828, and web and mobile API administration and management module 830. The registration module 808 and the user administration management and administration module 822 provide, illustratively, for the delivery and management of a subscription-based services model whereby individual users subscribe in order to access the multi-dimensional DLT-based business hub the execution of one or more of the private business hub applications 118. In an embodiment, the user may initially subscribe, as facilitated by the registration module 808 for a defined fee in a tier subscription system such that users who pay more for their access subscription are provided priority and other advantages over other users in lower tiers or who are subscribed through a base "no fee" trial plan (e.g., a free 30 day trial period). The registration module 808 will also provide for the creation and maintenance of individual user profiles for each subscribed user in conjunction with the various party modules. Further, in an embodiment, the data display interface module 818, and the communications module 812 are used to facilitate the input/output and display of electronic data and other information (e.g., a graphical user interface) to, illustratively, the users employing the user device 700 (e.g., a touch screen of the user device 700) and executing any one of the private business hub applications 118 including, but not limited to, the operations executed by each and every of the foregoing modules are, for example, as discussed herein above with reference to FIGS. 2-5.

Figure 16:
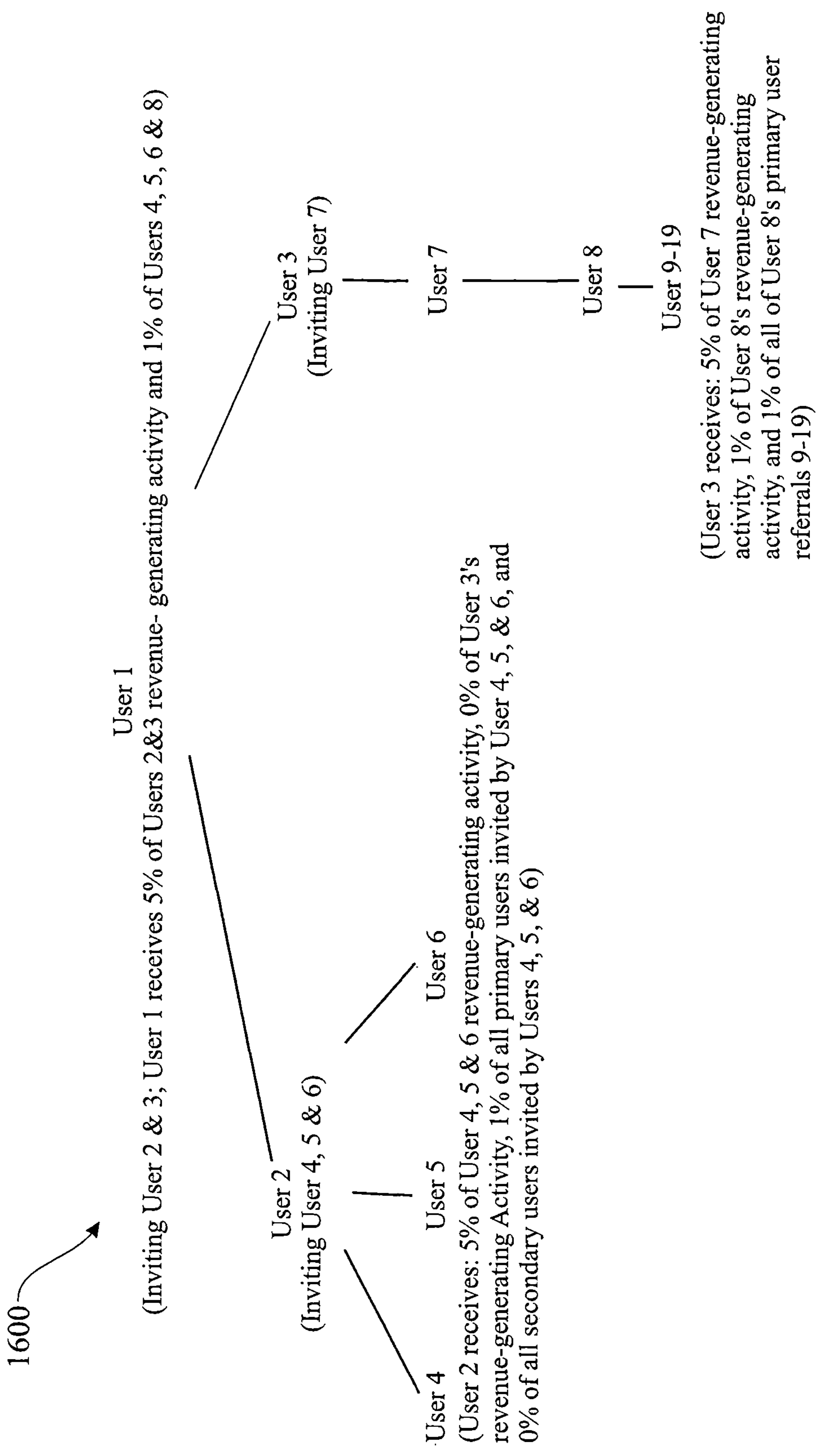
FIG. 16 presents a commission tree structure in accordance with an embodiment.

As noted above, in an embodiment, the chat communication types also serve a purpose in an auto-referral multi-layer marketing (MLM) structure hereinunder that provides a revenue generation mechanism for new user referrals that are made by existing user(s). Illustratively, this may be executed directly in accordance with the paychat platform app 900, an auto-referral for MLM application (i.e., another one of the private business hub applications 118), the e-commerce application 166, and/or a combination thereof working together. This auto-referral MLM aspect allows for individual users to refer other "new" users to the platform through the use of one or more of the chat types (e.g., paychats, business chats and/or personal chats). In this way, when such referred user make a purchase across the e-commerce platform 144, for example, the referring user will earn a commission. For example, if a referred user makes purchases where the platform earns in commission one hundred U.S. dollars ($100.00), then this commission structure ensues from the platform's commission in accordance with an embodiment as set forth in the tree structure 1600 set forth in FIG. 16. As such, one purpose of the various chats (i.e., paychat, business chat and/or personal chat) is the ability to add a person to the ecosystem and that person is part of your downline, so whatever revenue generation they may be attributed to, you get a percentage of it, as you brought them into the ecosystem as a friend or business colleague. For example, when your friend requested you to join the platform in the very first instance, and added you to his personal chat, you are notated on the private blockchain to be in his 1$^{st}$ downline. Thus, when you earn money for the platform, he also receives compensation. If you do any type of e-commerce spending (e.g., by and through the e-commerce platform 144), this will come into play such that a person that added you will also earn compensation every time you text message someone on the paychat platform. This provides an incentive for an individual to get as many people as they can to join the platform under them (i.e., the genealogy) to take full advantage of the auto-referral MLM framework aspects of the disclosed embodiments.

Turning our attention to FIG. 9, an illustrative architecture for the operation of the paychat platform app 900 (paychat platform application 120 being configured the same) is presented in accordance with an embodiment. As will be appreciated, the architecture may be used, illustratively, in conjunction with the cloud network services architecture 100, the DLT-based private business hub system 110, and/or the user device 700 for launching and executing the paychat platform and its associated operations (as detailed herein above). As shown, the architecture for the operations of the paychat platform app 900 provides several interfaces and engines used to perform a variety of functions such as the collection, aggregation, manipulation, processing, analyzing, verification, authentication, and display of applicable real-time information and data that are useful to realize the delivery of the paychat messaging platform and associated operations of the disclosed embodiments. More particularly, data display interface module 918 and communications module 912 are used to facilitate the input/output and display of electronic data and other information to, illustratively, the users (e.g., the user 2 160) employing the user device 2 138 (e.g., a touch screen of the user device) and executing the paychat platform app 900. The data collection module 906 facilitates data gathering from a plurality of users and other third parties. The location-based services module 920 provides for the delivery of location-based services in order for the geographic locations of the users to be identified and displayed (e.g., GPS locations), as detailed above, in accordance with any location-based/proximity-based features of the disclosed embodiments. The communications module 912 will also facilitate communications by and through the DLT-based private business hub system 110, for example.

Execution engine 902 may be employed to deliver the paychat messaging platform services herein through the execution of the paychat platform app 900. In such delivery, the execution engine 902 will operate and execute, as further detailed herein below, with at least the following program modules: private/public DLT administration and management module 904, data collection module 906, registration and verification module 908, smart contract administration and management module 910, communications module 912, paychat platform operations module 914, digital wallet administration and management module 916, data display interface module 918, paychat, business chat and personal chat operations module 922, broadcast chat operations administration and management module 924, electronic business card administration and module 926, payment administration and management module 928, channel chat operations module 930, personal contact administration and management module 932, business contact administration and management module 934, and speed networking operations module 936. The registration and verification module 908 provide for the delivery and management of a subscription-based model (as detailed previously) whereby individual users subscribe in order to access the paychat messaging platform services through execution of the paychat platform app 900 and engaging in their personal chat and business paychat sessions. In an embodiment, the user may initially subscribe, as facilitated by the registration and verification module 908 for a defined fee in a tier subscription system such that users who pay more for their access subscription are provided priority and other advantages over other users in lower tiers or who are subscribed through a base "no fee" trial plan (e.g., a free 30 day trial period). The registration and verification module 908 will also provide for the creation and maintenance of individual user profiles for each subscribed user in conjunction with the various party modules. Further, in an embodiment, the data display interface module 918, and the communications module 912 are used to facilitate the input/output and display of electronic data and other information (e.g., a graphical user interface) to, illustratively, the users employing the user device 700 (e.g., a touch screen of the user device 700) and executing the paychat platform app 900. The data collection interface 906 facilitates chat services information collection from the various parties involved in defining, deploying and/or executing the personal chat, business chat, and paychat sessions hereunder. The operations executed by each and every of the foregoing modules are, for example, as discussed herein above with reference to FIGS. 2-5.

The following discussion will serve to further elaborate on such operations and the illustrative user interfaces detailed herein and their practical user application:

Select Paychat Instructions

Invite someone to your Paychat (paychat home tab/top folder on the user interface): In the ID section (Me tab), create a PSPay ID. Show the card for someone to scan in the paychat section of the user interface to have them gain exclusive access to pay to text you directly or, you may publicly display the unique ID (called "PSPID") for someone to enter into a direct chat with you. Your channel(s) and 1-to-1 messages show up in the top folder of the paychat interface. These texts may be particularly important given that people are paying (via private blockchain using the crypto tokens or via credit card) to exclusively speak/chat to/with you. A dial may appear as part of the interface that allows you to control the cost to text you (i.e., the paychat rate for the paychat payment).

Create an exclusive Group Channel (paychat channels also appear in the paychat home tab, on the top folder of the user interface): Create a personal channel ID (called "PSCID") card in "Me" home tab of the user interface. Upload banner image. Send this card out to a scan section in the paid contacts portion of the user interface, or give them your unique PSCID to enter in. This channel appears as a banner image in your top folder of the paychat interface along with other 1-to-1 messages. (See, e.g., FIG. 15 as discussed herein below). From the perspective of the people you have invited this will appear for them in a bottom folder (i.e., paid contacts) as part of the interface.

Get invited to an exclusive paychat (i.e., one-on-one; e.g., the perspective of a person who wants to join a paychat that belongs to a celebrity, doctor, lawyer, etc.): Go to the a tab of the bottom folder of the paychat interface. Scan their PSPID (paychat personal ID) barcode on their PSPID card or enter the PSPID and buy crypto tokens or pay with credit card. Thus, a credit card may be used to settle the transaction in the crypto token such that that crypto token may be sold on the open market on a third party exchange to receive equivalent U.S. dollars, for example. Anything that occurs on any open market is transacted across a public blockchain (e.g., the public DLT 148). Text the special person and make business deals directly with the desired person (e.g., in highly encrypted structure).

Join an exclusive channel: Go to the interface icon (e.g., (+) button) on the bottom folder of the interface's paychat section. Obtain the channel's card to scan the barcode or enter PSCID. Other group members' texts, including the moderator, are free with exclusive access. Also, a difference between the PSCID and the PSPID is that for the channel you make a banner which is displayed in the messenger interface so you can distinguish this clearly and quickly as for the channel.

Select Non-Paychat Instructions

Join someone's Business (non-pay) chat (e.g., using top folder in first home tab "chat" of the user interface): This is like a normal chat messenger (where you do not pay each other and there is no need for any card), but with added separation between you and a client because you are keeping your personal information separated from them while still allowing them direct access to you like the instant messenger on your phone. On the other hand, you are know-your-customer (KYC'd) on the platform, so that the other party does not have to worry that you are a fictitious person. Illustratively, this may be located in the top folder of the chat interface-which is the first home screen of the bottom row of icons. Go to the interface icon (e.g., (+) section in the top folder of the chat user interface) to scan the barcode on their business ID to add the professional or enter their business email. Personal emails and personal cell phone numbers should not be used in your business chats. This is how the application and platform creates and maintains separation between you and your client. For example, you may provide your unique business card ID only to those who you want to have access directly to you. Also, you may provide other people's business cards, which allows clients to access your business colleagues in the same manner. Voice calls and video calls in the business non-paychat are able to be initiated by both persons without restriction. So, if you do not want your client to have access to contact you, then add them to your paychat instead. In your paychat, you do not share your business email, personal email or personal cell phone and create the maximum separation between you and a client.

Join Someone's Personal Chat as a Friend (e.g., bottom folder in first home tab "chat" of the user interface): This functionality is just like a normal personal messenger system, where a user may employ their mobile phone to add the person with their personal cell phone number or their personal email. As such, there is no use of an ID card for personal chats hereunder. You may proceed to contact, call and/or video call individuals or groups that are your friends. This also help keeps business contacts and personal contacts separate spatially so a text in the lower folder of the user interface may be quickly and automatically classified as non-business related if you are, for example, too busy to entertain your friends at that moment. Further, as discussed above, one purpose of the non-pay chat with normal message is the ability to add a person to the ecosystem and that person is part of your downline, so whatever money they conjure up, you get a percentage of it, as you brought them into the ecosystem as a friend or business colleague. As such, when your friend requested you to join the platform in the very first instance, and added you to his personal chat, you are notated on the private blockchain to be in his $1^{st}$ downline. Thus, when you earn money for the platform, he also receives compensation. If you do any type of e-commerce spending, this will come into play such that a person that added you will also earn compensation every time you text message someone on the paychat platform. This provides an incentive for an individual to get as many people as they can to join the platform under them to take full advantage of the auto-referral MLM framework, as discussed herein above.

Figure 15:
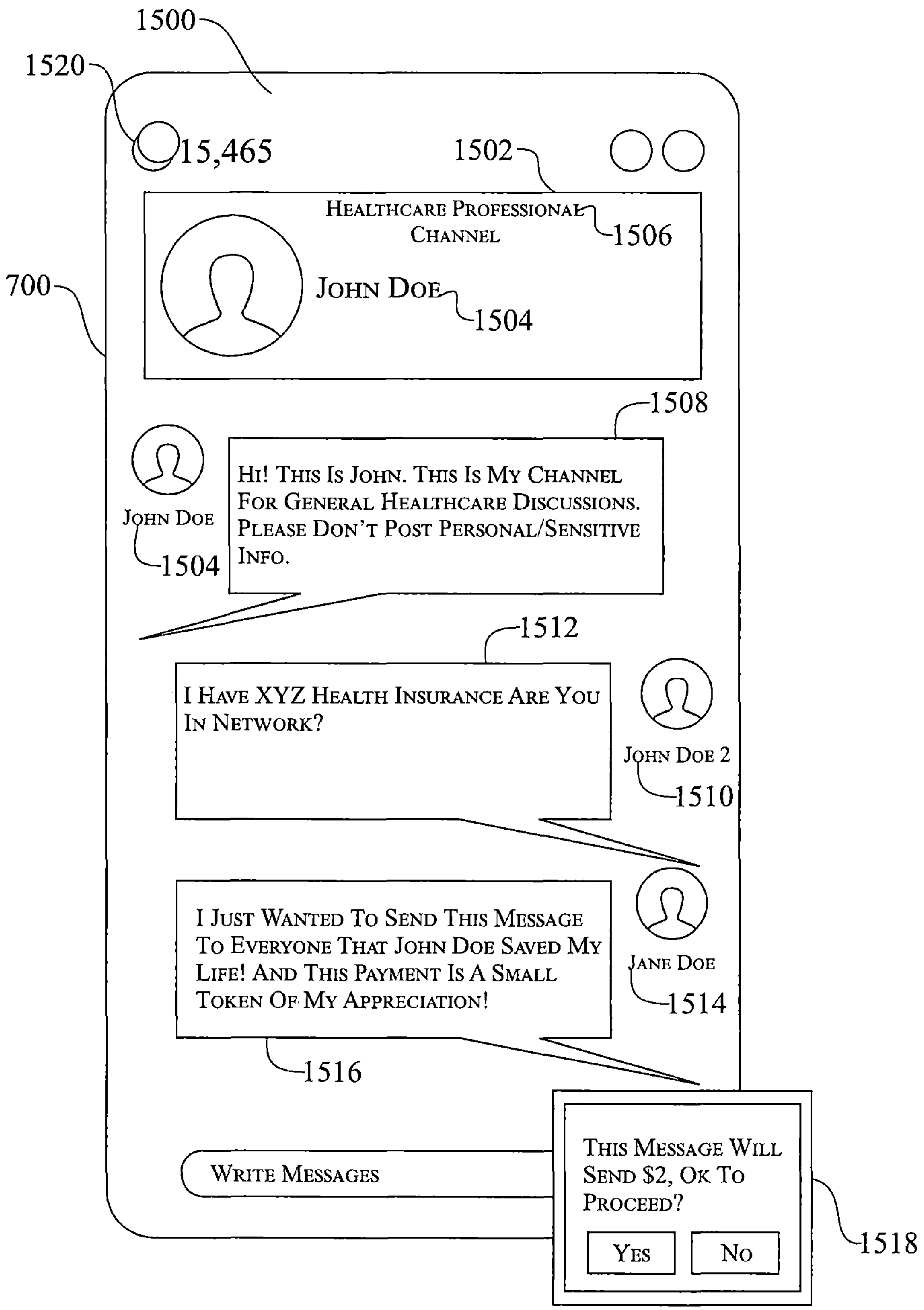
FIG. 15 presents an illustrative user device interface showing a paychat exchange comprising a channel in accordance with an embodiment.

Further to this discussion, FIG. 15 presents an illustrative user device interface 1500 showing a paychat exchange comprising a channel in accordance with an embodiment. As shown, the illustrative user device interface 1500 displayed on the user device 700 is that of John Doe 1504 who has created healthcare professional channel 1506 as displayed collectively on banner 1502 together with message 1508 from John Doe 1504. As such, John Doe 1504 may provide and share the healthcare professional channel 1506 (by and through a particular electronic business card, for example, the electronic business card 1012) to any other individual(s) that John Doe 1504 wants to provide access. For example, John Doe 2 1510 has been granted access as evidenced by their message 1512 posted on the healthcare professional channel 1506. Similarly, Jane Doe 1514 has been granted access to the healthcare professional channel 1506 and has created message 1516 that has not yet been sent and posted. The message 1516 will only be sent and posted if Jane Doe 1514 agrees to the paychat charge (as specified by John Doe 1504) as indicated in pop-up message 1518. Upon Jane Doe's 1514 concurrence to the message charge, the paychat payment will be transferred from their private controlled digital wallet (e.g., one of the private controlled digital wallets 134) to the private controlled digital wallet of John Doe 1504 (e.g., one of the private controlled digital wallets 134). In turn, cryptocurrency balance 1520 (associated with the private controlled walled of John Doe 1504) will be increased by the transferred cryptocurrency payment.

Those skilled in the art will appreciate that the present disclosure contemplates the use of systems configurations and/or computer instructions that may perform any or all of the operations detailed herein above. For example, the disclosure of computer instructions that include, for example, the paychat platform app 900 and the DLT-based private business hub system 110 and the associated private business hub applications 118 is not meant to be limiting in any way. Those skilled in the art will readily appreciate that stored computer instructions and/or systems configurations may be configured in any way while still accomplishing the various goals, features, and advantages according to the present disclosure. The terms "program," "application," "software application," and the like as used herein, are defined as a sequence of instructions designed for execution on a computer system. A "program," "computer program," "application," or "software application" may include a subroutine, a function, a procedure, an object method, an object implementation, an executable application, an applet, a servlet, a source code, an object code, a shared library/dynamic load library, and/or other sequence of instructions designed for execution on a computer system. Further, "platform(s)", as used herein, includes but is not limited to a computing system that combines hardware and software, including application frameworks. The platform may include a computer architecture, operating system, programming languages, and related user interfaces, including runtime system libraries and/or graphical user interfaces. Providing a "platform as a service" (PaaS) is a category of computing services that may provide an integrated platform with specific application solutions as a service, with various levels of scalability. Services may include providing specialized and/or customized hardware, such as, for example, networks, servers, storage, interface devices, etc., and software, such as, for example, applications, interfaces, and security. Hardware and/or software associated with the services may or may not be dedicated to one platform.

As is well known to those skilled in the art many careful considerations and compromises typically must be made when designing for the optimal manufacture of a commercial implementation any system, and in particular, the embodiments of the present invention. A commercial implementation in accordance with the spirit and teachings of the present invention may configured according to the needs of the particular application, whereby any aspect(s), feature(s), function(s), result(s), component(s), approach(es), or step(s) of the teachings related to any described embodiment of the present invention may be suitably omitted, included, adapted, mixed and matched, or improved and/or optimized by those skilled in the art, using their average skills and known techniques, to achieve the desired implementation that addresses the needs of the particular application.

Those of skill in the art will appreciate that where appropriate, some embodiments of the disclosure may be practiced in network computing environments with many types of computer system configurations, including personal computers, handheld devices, multi-processor systems, microprocessor-based or programmable consumer electronics, network PCs, minicomputers, mainframe computers, and the like. Where appropriate, embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices. "Software" may refer to prescribed rules to operate a computer. Examples of software may include code segments in one or more computer-readable languages; graphical and or/textual instructions; applets; pre-compiled code; interpreted code; compiled code; and computer programs. A network is a collection of links and nodes (e.g., multiple computers and/or other devices connected together) arranged so that information may be passed from one part of the network to another over multiple links and through various nodes. Examples of networks include the Internet, the public switched telephone network, wireless communications networks, computer networks (e.g., an intranet, an extranet, a local-area network, or a wide-area network), wired networks, and wireless networks.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. The flowchart and block diagrams in the figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

It will be readily apparent that the various methods and algorithms described herein may be implemented by, e.g., appropriately programmed general purpose computers and computing devices. Typically, a processor (e.g., a microprocessor) will receive instructions from a memory or like device, and execute those instructions, thereby performing a process defined by those instructions. Further, programs that implement such methods and algorithms may be stored and transmitted using a variety of known media. When a single device or article is described herein, it will be readily apparent that more than one device/article (whether or not they cooperate) may be used in place of single device/article. Similarly, where more than one device or article is described herein (whether or not they cooperate), it will be readily apparent that a single device/article may be used in place of the more than one device or article. The functionality and/or the features of a device may be alternatively embodied by one or more other devices which are not explicitly described as having such functionality/features. Thus, other embodiments of the present invention need not include the device itself.

The term "computer-readable medium" as used herein refers to any medium that participates in providing data (e.g., instructions) which may be read by a computer, a processor or a like device. Such a medium may take many forms, including but not limited to, non-volatile media, non-transitory media, volatile media, and transmission media. Non-volatile media include, for example, optical or magnetic disks and other persistent memory. Volatile media include dynamic random access memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media and non-transitory media include, for example, a floppy disk, a flexible disk, hard disk, magnetic tape, any other magnetic medium, a CD-ROM, DVD, any other optical medium, a RAM, a PROM, an EPROM, a FLASH-EEPROM, removable media, flash memory, a "memory stick", any other memory chip or cartridge, a carrier wave as described hereinafter, or any other medium from which a computer can read. Various forms of computer readable media may be involved in carrying sequences of instructions to a processor. For example, sequences of instruction may be delivered from RAM to a processor, may be carried over a wireless transmission medium, and/or may be formatted according to numerous formats, standards or protocols, such as Bluetooth, 4G, 5G, etc.

As noted above, in some embodiments the method(s) described above may be executed or carried out by a computing system including a non-transitory computer-readable storage medium, also described herein as a storage machine, that holds machine-readable instructions executable by a logic machine (i.e., a processor or programmable control device) to provide, implement, perform, and/or enact the above described methods, processes and/or tasks. When such methods and processes are implemented, the state of the storage machine may be changed to hold different data. For example, the storage machine may include memory devices such as various hard disk drives, CD, or DVD devices. The logic machine may execute machine-readable instructions via one or more physical information and/or logic processing devices. For example, the logic machine may be configured to execute instructions to perform tasks for a computer program. The logic machine may include one or more processors to execute the machine-readable instructions. The computing system may include a display subsystem to display a graphical user interface (GUI), or any visual element of the methods or processes described above. For example, the display subsystem, storage machine, and logic machine may be integrated such that the above method may be executed while visual elements of the disclosed system and/or method are displayed on a display screen for user consumption. The computing system may include an input subsystem that receives user input. The input subsystem may be configured to connect to and receive input from devices such as a mouse, keyboard, or gaming controller. For example, a user input may indicate a request that certain task is to be executed by the computing system, such as requesting the computing system to display any of the above-described information or requesting that the user input updates or modifies existing stored information for processing. A communication subsystem may allow the methods described above to be executed or provided over a computer network. For example, the communication subsystem may be configured to enable the computing system to communicate with a plurality of personal computing devices. The communication subsystem may include wired and/or wireless communication devices to facilitate networked communication. The described methods or processes may be executed, provided, or implemented for a user or one or more computing devices via a computer-program product such as via an application programming interface (API).

Thus, the steps of the disclosed method(s) and the associated discussion herein above can be defined by the computer program instructions stored in a memory and/or data storage device and controlled by a processor executing the computer program instructions. Accordingly, by executing the computer program instructions, the processor executes an algorithm defined by the disclosed method. For example, the computer program instructions can be implemented as computer executable code programmed by one skilled in the art to perform the illustrative operations defined by the disclosed methods. Further, it will be appreciated that any flowcharts, flow diagrams, state transition diagrams, pseudo code, program code and the like represent various processes which may be substantially represented in computer readable medium and so executed by a computer, machine, or processor, whether or not such computer, machine or processor is explicitly shown. One skilled in the art will recognize that an implementation of an actual computer or computer system may have other structures and may contain other components as well, and that a high level representation of some of the components of such a computer is for illustrative purposes.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. A method for implementing a chat room platform comprising:

establishing, using a distributed ledger technology (DLT)-based private business hub system, the chat room platform with structured multiple communication tiers having varying degrees of exclusivity, wherein the structured multiple communications tiers further comprise at least a personal chat tier for exchanging one-to-one personal chats using personal information and having a first degree of exclusivity, a business chat tier for exchanging one-to-one business chats using business information but void of any personal information and having a second degree of exclusivity, and a paychat tier for exchanging a first paychat type directed to one-to-one paychats or a second paychat type directed to one-to-many paychats using the business information and having a third degree of exclusivity:

establishing, by the DLT-based private business hub system, a first plurality of electronic business cards, each electronic business card of the first plurality of business cards being specific to the first paychat type, a respective one user of a plurality of users and a respective one channel of a plurality of channels, the respective one channel being associated with the respective one user and established by the respective one user as a specific channel for each chat thread they wish to engage with others with respect to a defined domain, and wherein each electronic business card of the first plurality of business cards is required for use by a plurality of chat initiating parties as an access token for triggering and engaging in a first paychat session with the respective one user specific thereto on the chat room platform and the first paychat session is viewable by each chat initiating party of the plurality of chat initiating parties whether or not they were the originating chat initiating party of the first paychat session, and wherein each electronic business card of the first plurality of electronic business cards includes information specific to the respective one user associated therewith comprising at least a name and a scannable identification code configured solely for use with a particular one channel of the plurality of channels but is void of any physical address, electronic mail address, and telephone number associated with the respective one user;

receiving, by the DLT-based private business hub system, from a user device associated with a particular one chat initiating party of the plurality of chat initiating parties, a request to initiate the first paychat session on the chat room platform with a particular one respective user of the plurality of users using the electronic business card of the first plurality of business cards specific thereto;

initiating, by the DLT-based private business hub system, the first paychat session between the particular one chat initiating party and the particular one respective user on the chat room platform;

providing a real-time variable rate control mechanism for use by the particular one respective user in adjusting a variable payment rate for at least a first business paychat payment during the first paychat session; and transferring, by the DLT-based private business hub system using a private DLT, the first business paychat payment from at least the particular one chat initiating party to the particular one respective user using a designated currency in response to the initiation of the first paychat session.

2. The method for implementing a chat room platform of claim 1, wherein the method further comprises:

prompting, prior to the initiation of the first paychat session, the particular one chat initiating party with a message comprising a specific charge for the first business paychat payment for the first paychat session;

receiving, in response to the message prompted, the particular one chat initiating party's acceptance to the specific charge for the first business paychat payment;

responsive to the acceptance received, initiating the first paychat session; and wherein the first paychat session is initiated only after the first business paychat payment has been transferred.

3. The method for implementing a chat room platform of claim 1, wherein the method further comprises:

establishing, by the DLT-based private business hub system, a second plurality of electronic business cards, each electronic business card of the second plurality of electronic business cards being specific to the second paychat type and a respective one user of the plurality of users and is required for use as an access token in triggering and engaging the respective one user in a second paychat session, wherein each electronic business card of the second plurality of electronic business cards includes information specific to the respective one user associated therewith comprising at least a name and a scannable identification code configured solely for use with the second paychat session but is void of any physical address, electronic mail address, and telephone number associated with the respective one user;

receiving, by the DLT-based private business hub system, from a user device associated with a particular one chat initiating party of the plurality of chat initiating parties, a request to initiate the second paychat session on the chat room platform with a particular one respective user of the plurality of users using the electronic business card of the second plurality of business cards specific thereto, the second paychat session being exclusive between the particular one respective user and the particular one chat initiating party initiating the second paychat session;

initiating, by the DLT-based private business hub system, the second paychat session between the particular one chat initiating party and the particular one respective user on the chat room platform; and transferring, by the DLT-based private business hub system using the private DLT, a second business paychat payment from the particular one chat initiating party to the particular one respective user using the designated currency in response to the initiation of the second paychat session.

4. The method for implementing a chat room platform of claim 3, wherein the method further comprises:

prompting, prior to the initiation of the second paychat session, the particular one chat initiating party with a message comprising a specific charge for the second business paychat payment for the second paychat session;

receiving, in response to the message prompted, the particular one chat initiating party's acceptance to the specific charge for the second business paychat payment for the second paychat session; and responsive to the acceptance received, initiating the second paychat session distributed ledger technology.

5. The method for implementing a chat room platform of claim 3, wherein the designated currency is an in-app cryptocurrency adopted for use with the private DLT.

6. The method for implementing a chat room platform of claim 3, wherein the designated currency is a cryptocurrency native to a public DLT and is one of: Bitcoin (BTC), Ethereum (ETH), Binance Coin (BNB), Tether (USDT), Solana (SOL), XRP (XRP), Cardano (ADA), USD Coin (USDC), Binance USD (BUSD), and Avalanche (AVAX).

7. The method for implementing a chat room platform of claim 1, wherein the method further comprises:

transferring, by the DLT-based private business hub system using the private DLT, the first business paychat payment from each of the other chat initiating parties of the plurality of chat initiating parties engaging in the first paychat session using the designated currency in response to the initiation of the first paychat session.

8. The method for implementing a chat room platform of claim 3, wherein the DLT-based private business hub system is a blockchain-based DLT and the private DLT is a blockchain.

9. The method for implementing a chat room platform of claim 6, wherein the DLT-based private business hub system is a blockchain-based DLT, the private DLT is a blockchain, and the public DLT is a blockchain.

10. The method for implementing a chat room platform of claim 3, wherein the method further comprises:

providing, by the DLT-based private business hub system using the private DLT, a plurality of digital wallets, each digital wallet of the plurality of wallets being specific to either one of the plurality of users or one of the plurality of chat initiating parties.

11. The method for implementing a chat room platform of claim 3, wherein the method further comprises:

establishing, by the DLT-based private business hub system, a third plurality of electronic business cards, each electronic business card of the third plurality of electronic business cards being specific to a respective one user of the plurality of users and required for use as an access token for triggering and engaging the particular one user in a business chat session, wherein each electronic business card of the third plurality of electronic business cards includes information specific to the respective one user associated therewith comprising at least a name, a physical address, an electronic mail address, a telephone number, and a scannable identification code configured solely for use with the business chat session;

receiving, by the DLT-based private business hub system, from a user device associated with a particular one chat initiating party of the plurality of chat initiating parties, a request to initiate the business chat session on the chat room platform with a particular one respective user of the plurality of users using the electronic business card of the third plurality of business cards specific thereto, the business chat session being exclusive between the particular one respective user and the particular one chat initiating party initiating the business chat session; and initiating, by the DLT-based private business hub system, the business chat session between the particular one chat initiating party and the particular one respective user on the chat room platform.

12. The method for implementing a chat room platform of claim 11, wherein the method further comprises:

receiving, by the DLT-based private business hub system, from a user device associated with a particular one chat initiating party of the plurality of chat initiating parties, a request to initiate a personal chat session on the chat room platform with a particular one respective user of the plurality of users, the personal chat session being exclusive between the particular one respective user and the particular one chat initiating party initiating the personal chat session; and initiating, by the DLT-based private business hub system, the personal chat session between the particular one chat initiating party and the particular one respective user on the chat room platform.

13. The method for implementing a chat room platform of claim 1, wherein the first business paychat payment transferred is from a first digital wallet associated with the particular one chat initiating party to a second digital wallet associated with the particular one respective user, wherein the first digital wallet and the second digital wallet are private digital wallets managed by the private DLT.

14. The method for implementing a chat room platform of claim 3, wherein at least one of the first paychat session and the second paychat session is for a specific time duration.

15. The method for implementing a chat room platform of claim 3, wherein at least one of the first business paychat payment and the second business paychat payment is determined using the variable payment rate, and the method further comprises:

receiving, in real-time, at least one adjustment to the variable payment rate from the particular one respective user; and adjusting, in real-time, the variable payment rate based on the at least one adjustment received.

16. The method for implementing a chat room platform of claim 1, wherein the method further comprises:

registering, by the DLT-based private business hub system, a subset of the plurality of chat initiating parties for a speed network, wherein the speed network is exclusive to the subset of the plurality of chat initiating parties registered and a specific industry or specialty;

receiving, by the DLT-based private business hub system, a speed network chat session request from a particular one chat initiating party of the subset of the plurality of chat initiating parties; and responsive to the speed network chat session received, automatically initiating, by the DLT-based private business hub system, the speed network chat session between the particular one chat initiating party registered and the other chat initiating parties of the subset of the plurality of chat initiating parties registered.

17. A method for implementing a chat room platform comprising:

establishing, using a distributed ledger technology (DLT)-based private business hub system, the chat room platform with structured multiple communication tiers having varying degrees of exclusivity, wherein the structured multiple communications tiers further comprise at least a personal chat tier for exchanging one-to-one personal chats using personal information and having a first degree of exclusivity, a business chat tier for exchanging one-to-one business chats using business information but void of any personal information and having a second degree of exclusivity, and a paychat tier for exchanging a first paychat type directed to one-to-one paychats or a second paychat type directed to one-to-many paychats using the business information and having a third degree of exclusivity;

establishing, by the DLT-based private business hub system, a first plurality of electronic business cards, each electronic business card of the first plurality of business cards being specific to a respective one user of a plurality of users and a respective one channel of a plurality of channels, the respective one channel being associated with the respective one user and established by the respective one user as a specific channel for each chat thread they wish to engage with others with respect to a defined domain, and wherein each electronic business card of the first plurality of business cards is required for use by a plurality of chat initiating parties as an access token for triggering and engaging in a first paychat session with the respective one user specific thereto on the chat room platform and the first paychat session is viewable by each chat initiating party of the plurality of chat initiating parties whether or not they were the originating chat initiating party of the first paychat session, and wherein each electronic business card of the first plurality of electronic business cards includes information specific to the respective one user associated therewith comprising at least a name and a scannable identification code configured solely for use with a particular one channel of the plurality of channels but is void of any physical address, electronic mail address, and telephone number associated with the respective one user;

receiving, by the DLT-based private business hub system, from a user device associated with a particular one chat initiating party of the plurality of chat initiating parties, a request to initiate the first paychat session on the chat room platform with a particular one respective user of the plurality of users using the electronic business card of the first plurality of business cards specific thereto;

initiating, by the DLT-based private business hub system, the first paychat session between the particular one chat initiating party and the particular one respective user on the chat room platform;

providing, by the DLT-based private business hub system using a private DLT, a plurality of digital wallets, each digital wallet of the plurality of wallets being specific to either one of the plurality of users or one of the plurality of chat initiating parties;

providing a real-time variable rate control mechanism for use by the particular one respective user in adjusting a variable payment rate for at least a first business paychat payment during the first paychat session; and transferring, by the DLT-based private business hub system using the private DLT, the first business paychat payment from the digital wallet specific to the particular one chat initiating party to the digital wallet specific to the particular one respective user using a cryptocurrency in response to the initiation of the first paychat session.

18. The method for implementing a chat room platform of claim 17, wherein the method further comprises:

establishing, by the DLT-based private business hub system, a second plurality of electronic business cards, each electronic business card of the second plurality of electronic business cards being specific to a respective one user of the plurality of users for use as an access token for triggering and in engaging the respective one user in a second paychat session, wherein each electronic business card of the second plurality of electronic business cards includes information specific to the respective one user associated therewith comprising at least a name and a scannable identification code configured solely for use with the second paychat session but is void of any physical address, electronic mail address, and telephone number associated with the respective one user;

receiving, by the DLT-based private business hub system, from a user device associated with a particular one chat initiating party of the plurality of chat initiating parties, a request to initiate the second paychat session on the chat room platform with a particular one respective user of the plurality of users using the electronic business card of the second plurality of business cards specific thereto, the second paychat session being exclusive between the particular one respective user and the particular one chat initiating party initiating the second paychat session;

initiating, by the DLT-based private business hub system, the second paychat session between the particular one chat initiating party and the particular one respective user on the chat room platform; and transferring, by the DLT-based private business hub system using the private DLT, a second business paychat payment from the particular one chat initiating party to the particular one respective user using the cryptocurrency in response to the initiation of the second paychat session.

19. A method for implementing a chat room platform comprising:

establishing, using a distributed ledger technology (DLT)-based private business hub system, the chat room platform with structured multiple communication tiers having varying degrees of exclusivity, wherein the structured multiple communications tiers further comprise at least a personal chat tier for exchanging one-to-one personal chats using personal information and having a first degree of exclusivity, a business chat tier for exchanging one-to-one business chats using business information but void of any personal information and having a second degree of exclusivity, and a paychat tier for exchanging a first paychat type directed to one-to-one paychats or a second paychat type directed to one-to-many paychats using the business information and having a third degree of exclusivity;

establishing, by the DLT-based private business hub system, a first plurality of electronic business cards, each electronic business card of the first plurality of business cards being specific to the first paychat type, a respective one user of a plurality of users and a respective one channel of a plurality of channels, the respective one channel being associated with the respective one user and established by the respective one user as a specific channel for each chat thread they wish to engage with others with respect to a defined domain, and wherein each electronic business card of the first plurality of business cards is required for use by a plurality of chat initiating parties as an access token for triggering and engaging in a first paychat session with the respective one user specific thereto on the chat room platform and the first paychat session is viewable by each chat initiating party of the plurality of chat initiating parties whether or not they were the originating chat initiating party of the first paychat session, and wherein each electronic business card of the first plurality of electronic business cards includes information specific to the respective one user associated therewith comprising at least a name and a scannable identification code configured solely for use with a particular one channel of the plurality of channels but is void of any physical address, electronic mail address, and telephone number associated with the respective one user;

receiving, by the DLT-based private business hub system, from a user device associated with a particular one chat initiating party of the plurality of chat initiating parties, a request to initiate the first paychat session on the chat room platform with a particular one respective user of the plurality of users using the electronic business card of the first plurality of business cards specific thereto;

initiating, by the DLT-based private business hub system, the first paychat session between the particular one chat initiating party and the particular one respective user on the chat room platform;

providing, by the DLT-based private business hub system using a private DLT, a plurality of digital wallets, each digital wallet of the plurality of wallets being specific to either one of the plurality of users or one of the plurality of chat initiating parties;

providing a real-time variable rate control mechanism for use by the particular one respective user in adjusting a variable payment rate for the first paychat type or the second paychat type;

receiving at least one real-time adjustment to the variable payment rate during the first paychat session with respect to a first business paychat payment;

transferring, by the DLT-based private business hub system using the private DLT, the first business paychat payment from the digital wallet specific to the particular one chat initiating party to the digital wallet specific to the particular one respective user using a cryptocurrency in response to the initiation of the first paychat session;

establishing, by the DLT-based private business hub system, a second plurality of electronic business cards, each electronic business card of the second plurality of electronic business cards being specific to the second paychat type and a respective one user of the plurality of users and required for use as an access token in triggering and engaging the respective one user in a second paychat session, wherein each electronic business card of the second plurality of electronic business cards includes information specific to the respective one user associated therewith comprising at least a name and a scannable identification code configured solely for use with the second paychat session but is void of any physical address, electronic mail address, and telephone number associated with the respective one user;

receiving, by the DLT-based private business hub system, from a user device associated with a particular one chat initiating party of the plurality of chat initiating parties, a request to initiate the second paychat session on the chat room platform with a particular one respective user of the plurality of users using the electronic business card of the second plurality of business cards specific thereto, the second paychat session being exclusive between the particular one respective user and the particular one chat initiating party initiating the second paychat session;

prompting, by the DLT-based private business hub system, the particular one chat initiating party with a message comprising a specific charge for the second business paychat payment for the second paychat session;

receiving, by the DLT-based private business hub system, a response to the message prompted from the particular one chat initiating party indicating their agreement to pay the specific charge for the second business paychat payment for the second paychat session;

responsive to the response received, initiating, by the DLT-based private business hub system, the second paychat session between the particular one chat initiating party and the particular one respective user on the chat room platform;

receiving at least one real-time adjustment to the variable payment rate during the second paychat session with respect to a second business paychat payment;

transferring, by the DLT-based private business hub system using the private DLT, the second business paychat payment from the digital wallet specific to the particular one chat initiating party to the digital wallet specific to the particular one respective user using the cryptocurrency in response to the initiation of the second paychat session;

establishing, by the DLT-based private business hub system, a third plurality of electronic business cards, each electronic business card of the third plurality of electronic business cards being specific to a respective one user of the plurality of users for use as an access token in triggering and engaging the particular one user in a business chat session, wherein each electronic business card of the third plurality of electronic business cards includes information specific to the respective one user associated therewith comprising at least a name, a physical address, an electronic mail address, a telephone number, and a scannable identification code configured solely for use with the business chat session;

receiving, by the DLT-based private business hub system, from a user device associated with a particular one chat initiating party of the plurality of chat initiating parties, a request to initiate the business chat session on the chat room platform with a particular one respective user of the plurality of users using the electronic business card of the third plurality of business cards specific thereto, the business chat session being exclusive between the particular one respective user and the particular one chat initiating party initiating the business chat session;

initiating, by the DLT-based private business hub system, the business chat session between the particular one chat initiating party and the particular one respective user on the chat room platform;

wherein the DLT-based private business hub system is a blockchain-based DLT and the private DLT is a blockchain;

wherein at least one of the first paychat session and the second paychat session is for a specific time duration; and wherein the first business paychat payment and the second business paychat payment are determined as a function the variable payment rate.

* * * * *